(12) United States Patent
Fourcand

(10) Patent No.: US 8,494,009 B2
(45) Date of Patent: Jul. 23, 2013

(54) NETWORK CLOCK SYNCHRONIZATION TIMESTAMP

(75) Inventor: Serge Francois Fourcand, Fairview, TX (US)

(73) Assignee: Futurewei Technologies, Inc., Plano, TX (US)

( * ) Notice: Subject to any disclaimer, the term of this patent is extended or adjusted under 35 U.S.C. 154(b) by 462 days.

(21) Appl. No.: 11/735,592

(22) Filed: Apr. 16, 2007

(65) Prior Publication Data

US 2008/0075120 A1 Mar. 27, 2008

Related U.S. Application Data

(60) Provisional application No. 60/886,833, filed on Jan. 26, 2007, provisional application No. 60/857,741, filed on Nov. 8, 2006, provisional application No. 60/826,764, filed on Sep. 25, 2006.

(51) Int. Cl.
*H04J 3/06* (2006.01)

(52) U.S. Cl.
USPC ......................................................... 370/509

(58) Field of Classification Search
USPC ........... 370/503–520; 375/229–236, 362–368
See application file for complete search history.

(56) References Cited

U.S. PATENT DOCUMENTS

| | | | |
|---|---|---|---|
| 5,303,241 A | 4/1994 | Takada et al. | |
| 5,361,261 A | 11/1994 | Edem et al. | |
| 5,367,524 A | 11/1994 | Rideout, Jr. et al. | |
| 5,434,848 A | 7/1995 | Chimento, Jr. et al. | |
| 5,696,798 A | 12/1997 | Wright et al. | |
| 5,802,051 A | 9/1998 | Petersen et al. | |
| 5,933,607 A | 8/1999 | Tate et al. | |
| 6,049,541 A | 4/2000 | Kerns et al. | |
| 6,233,237 B1 | 5/2001 | Yucebay et al. | |
| 6,272,109 B1 | 8/2001 | Pei et al. | |

(Continued)

FOREIGN PATENT DOCUMENTS

| | | |
|---|---|---|
| CN | 1293843 | 5/2001 |
| CN | 1352841 A1 | 6/2002 |

(Continued)

OTHER PUBLICATIONS

Foreign Communication From a Related Counterpart Application—International Search Report and Written Opinion, PCT/CN2008/070632, Jul. 10, 2008, 5 pages.

(Continued)

*Primary Examiner* — Thai Hoang
(74) *Attorney, Agent, or Firm* — Conley Rose, P.C.; Grant Rodolph; Rayhao Chung

(57) ABSTRACT

A network component comprising at least one processor configured to promote transmission of a frame from a first node to a second node, the frame comprising a first clock synchronization data, and a first frame count, wherein the first clock synchronization data and the first frame count are used to synchronize a first clock in the first node and a second clock in the second node. Also disclosed is a method comprising processing a frame comprising an Ethernet control symbol that delineates the beginning of the frame, a first clock synchronization data, a first frame count, and a second clock synchronization data. Included is an Ethernet node comprising at least one processor configured to synchronize a clock using a clock synchronization data comprising a first timestamp, a first frame count, a second timestamp, and a second frame count.

20 Claims, 9 Drawing Sheets

| Octet | \multicolumn{8}{c|}{Bit} |||||||| 
|---|---|---|---|---|---|---|---|---|
| | 0 | 1 | 2 | 3 | 4 | 5 | 6 | 7 |
| 0 | \multicolumn{8}{c|}{LSB T-Sync Timestamp (00:07)} |||||||| 
| 1 | \multicolumn{8}{c|}{T-Sync Timestamp (08:15)} |||||||| 
| 2 | \multicolumn{8}{c|}{MSB T-Sync Timestamp (16:23)} |||||||| 
| 3 | \multicolumn{5}{c|}{Clock Quality (0:4)} ||||| Open | Open | Parity 2 |
| 4 | \multicolumn{8}{c|}{LSB T-FC Timestamp (00:07)} |||||||| 
| 5 | \multicolumn{8}{c|}{MSB T-FC Timestamp (08:15)} |||||||| 
| 6 | \multicolumn{7}{c|}{Open} ||||||| Parity 3 |

708

U.S. PATENT DOCUMENTS

| | | | |
|---|---|---|---|
| 6,320,877 B1 | 11/2001 | Humphrey et al. | |
| 6,487,169 B1 | 11/2002 | Tada | |
| 6,496,477 B1 | 12/2002 | Perkins et al. | |
| 6,501,810 B1 | 12/2002 | Karim et al. | |
| 6,570,890 B1 | 5/2003 | Keenan et al. | |
| 6,570,891 B1 | 5/2003 | Arimilli | |
| 6,577,631 B1 | 6/2003 | Keenen et al. | |
| 6,633,566 B1 | 10/2003 | Pierson, Jr. | |
| 6,674,750 B1 | 1/2004 | Castellano | |
| 6,674,756 B1* | 1/2004 | Rao et al. | 370/395.21 |
| 6,754,206 B1 | 6/2004 | Nattkemper et al. | |
| 6,771,614 B1* | 8/2004 | Jones et al. | 370/310 |
| 6,816,500 B1 | 11/2004 | Mannette et al. | |
| 6,847,644 B1 | 1/2005 | Jha | |
| 6,859,458 B2 | 2/2005 | Yuang et al. | |
| 6,868,093 B1 | 3/2005 | Bohm et al. | |
| 6,874,048 B2 | 3/2005 | Knapp et al. | |
| 6,944,163 B2 | 9/2005 | Bottorff et al. | |
| 6,959,151 B1 | 10/2005 | Cotter et al. | |
| 6,985,497 B2* | 1/2006 | Hsu et al. | 370/477 |
| 6,985,499 B2 | 1/2006 | Elliott | |
| 6,999,479 B1 | 2/2006 | Jha | |
| 7,007,099 B1 | 2/2006 | Donati et al. | |
| 7,031,341 B2 | 4/2006 | Yu | |
| 7,043,651 B2 | 5/2006 | Aweya et al. | |
| 7,089,485 B2 | 8/2006 | Azadet et al. | |
| 7,103,124 B1* | 9/2006 | Lindskog et al. | 375/354 |
| 7,139,338 B2 | 11/2006 | Wilson et al. | |
| 7,188,189 B2 | 3/2007 | Karol et al. | |
| 7,236,126 B2 | 6/2007 | Jeon et al. | |
| 7,257,087 B2 | 8/2007 | Grovenburg | |
| 7,305,002 B1 | 12/2007 | Ageby et al. | |
| 7,324,537 B2 | 1/2008 | Samudrala et al. | |
| 7,403,514 B1 | 7/2008 | Moulsley | |
| 7,436,765 B2 | 10/2008 | Sisto et al. | |
| 7,453,885 B2 | 11/2008 | Rogers | |
| 7,463,709 B2 | 12/2008 | Raphaeli et al. | |
| 7,496,112 B1 | 2/2009 | Danielson et al. | |
| 7,519,747 B1 | 4/2009 | Cory et al. | |
| 7,613,212 B1 | 11/2009 | Raz et al. | |
| 7,646,710 B2 | 1/2010 | Christie, IV | |
| 7,986,700 B2 | 7/2011 | Fourcand | |
| 2001/0043603 A1 | 11/2001 | Yu | |
| 2001/0053130 A1* | 12/2001 | Tanaka et al. | 370/252 |
| 2002/0068593 A1 | 6/2002 | Deltour et al. | |
| 2002/0087716 A1 | 7/2002 | Mustafa | |
| 2002/0131425 A1* | 9/2002 | Shalom | 370/401 |
| 2002/0141456 A1 | 10/2002 | Wang et al. | |
| 2002/0163926 A1 | 11/2002 | Moharram | |
| 2002/0176389 A1 | 11/2002 | Colombo | |
| 2003/0095568 A1* | 5/2003 | Tominaga et al. | 370/466 |
| 2003/0117899 A1 | 6/2003 | Eidson | |
| 2003/0147348 A1* | 8/2003 | Jiang | 370/229 |
| 2003/0161307 A1 | 8/2003 | Lo | |
| 2003/0174700 A1 | 9/2003 | Ofek et al. | |
| 2003/0179755 A1* | 9/2003 | Fraser | 370/395.42 |
| 2003/0219042 A1 | 11/2003 | Tosa | |
| 2004/0001483 A1 | 1/2004 | Schmidt et al. | |
| 2004/0001502 A1* | 1/2004 | Garmire et al. | 370/447 |
| 2004/0028408 A1 | 2/2004 | Cox et al. | |
| 2004/0047367 A1 | 3/2004 | Mammen | |
| 2004/0062265 A1 | 4/2004 | Poledna | |
| 2004/0063401 A1 | 4/2004 | Meckelburg et al. | |
| 2004/0066775 A1* | 4/2004 | Grovenburg | 370/350 |
| 2004/0071166 A1 | 4/2004 | Yen et al. | |
| 2004/0076166 A1 | 4/2004 | Patenaude | |
| 2004/0120438 A1 | 6/2004 | Forte | |
| 2004/0151125 A1 | 8/2004 | Holmeide et al. | |
| 2004/0177162 A1 | 9/2004 | Wetzel et al. | |
| 2004/0179551 A1 | 9/2004 | Lentine et al. | |
| 2004/0208554 A1 | 10/2004 | Wakai et al. | |
| 2004/0213149 A1 | 10/2004 | Mascolo | |
| 2004/0252688 A1 | 12/2004 | May et al. | |
| 2005/0041691 A1 | 2/2005 | Laufer et al. | |
| 2005/0099988 A1 | 5/2005 | Wang et al. | |
| 2005/0117576 A1 | 6/2005 | McDysan et al. | |
| 2005/0129028 A1* | 6/2005 | Peeters et al. | 370/395.21 |
| 2005/0141568 A1 | 6/2005 | Kwak et al. | |
| 2005/0175013 A1* | 8/2005 | Le Pennec et al. | 370/395.42 |
| 2005/0190796 A1 | 9/2005 | Date et al. | |
| 2005/0254484 A1 | 11/2005 | Barzegar et al. | |
| 2005/0278457 A1 | 12/2005 | Hall et al. | |
| 2005/0281217 A1 | 12/2005 | Mottier | |
| 2006/0015507 A1 | 1/2006 | Butterworth et al. | |
| 2006/0092985 A1 | 5/2006 | Cho et al. | |
| 2006/0104302 A1 | 5/2006 | Cho et al. | |
| 2006/0109864 A1* | 5/2006 | Oksman | 370/474 |
| 2006/0123126 A1 | 6/2006 | Kim et al. | |
| 2006/0176905 A1 | 8/2006 | Liu et al. | |
| 2006/0182144 A1 | 8/2006 | Dove et al. | |
| 2006/0233116 A1 | 10/2006 | Kyusojin et al. | |
| 2006/0239300 A1 | 10/2006 | Hannel et al. | |
| 2006/0256768 A1 | 11/2006 | Chan | |
| 2006/0274791 A1* | 12/2006 | Garcia et al. | 370/508 |
| 2007/0008958 A1 | 1/2007 | Clemm et al. | |
| 2007/0014372 A1 | 1/2007 | Hershbarger | |
| 2007/0022209 A1 | 1/2007 | Delvai et al. | |
| 2007/0031153 A1 | 2/2007 | Aronson et al. | |
| 2007/0064587 A1 | 3/2007 | Langley et al. | |
| 2007/0076605 A1 | 4/2007 | Cidon et al. | |
| 2007/0097926 A1 | 5/2007 | Liu et al. | |
| 2007/0121661 A1 | 5/2007 | Ohta et al. | |
| 2007/0140127 A1 | 6/2007 | Frei | |
| 2007/0192515 A1* | 8/2007 | Kraus | 710/22 |
| 2007/0201356 A1 | 8/2007 | Liao et al. | |
| 2007/0201365 A1 | 8/2007 | Skoog et al. | |
| 2007/0206602 A1* | 9/2007 | Halabi et al. | 370/395.4 |
| 2007/0206603 A1 | 9/2007 | Weich et al. | |
| 2007/0206709 A1 | 9/2007 | Kermosh et al. | |
| 2007/0211720 A1 | 9/2007 | Fuchs et al. | |
| 2007/0211750 A1 | 9/2007 | Li et al. | |
| 2007/0222648 A1 | 9/2007 | Sontag et al. | |
| 2007/0258419 A1 | 11/2007 | Zhao et al. | |
| 2007/0297375 A1 | 12/2007 | Bonta et al. | |
| 2007/0299987 A1 | 12/2007 | Parker et al. | |
| 2008/0031136 A1* | 2/2008 | Gavette et al. | 370/235 |
| 2008/0043732 A1 | 2/2008 | Desai et al. | |
| 2008/0071924 A1 | 3/2008 | Chilukoor | |
| 2008/0074996 A1 | 3/2008 | Fourcand | |
| 2008/0075069 A1 | 3/2008 | Fourcand | |
| 2008/0075124 A1 | 3/2008 | Fourcand | |
| 2008/0123541 A1* | 5/2008 | Dielissen et al. | 370/252 |
| 2008/0130689 A1 | 6/2008 | Kumar et al. | |
| 2008/0137675 A1* | 6/2008 | Pauwels | 370/412 |
| 2008/0181114 A1 | 7/2008 | Fourcand | |
| 2008/0250469 A1 | 10/2008 | Agnoli et al. | |
| 2009/0168797 A1 | 7/2009 | Danielson et al. | |
| 2009/0254685 A1 | 10/2009 | Diepstraten et al. | |
| 2009/0274172 A1 | 11/2009 | Shen et al. | |
| 2010/0135314 A1 | 6/2010 | Fourcand | |
| 2010/0135315 A1 | 6/2010 | Fourcand | |
| 2010/0284421 A1 | 11/2010 | Fourcand | |
| 2010/0316069 A1 | 12/2010 | Fourcand | |

FOREIGN PATENT DOCUMENTS

| | | |
|---|---|---|
| CN | 1512683 A | 7/2004 |
| CN | 1516463 A | 7/2004 |
| CN | 1522077 | 8/2004 |
| CN | 1522510 A | 8/2004 |
| CN | 1529471 A | 9/2004 |
| CN | 1571348 | 1/2005 |
| CN | 1575568 A | 2/2005 |
| CN | 1601951 A | 3/2005 |
| CN | 1710828 | 12/2005 |
| CN | 1728720 A | 2/2006 |
| CN | 1767499 | 5/2006 |
| CN | 1770673 | 5/2006 |
| CN | 1773887 | 5/2006 |
| CN | 1788501 A | 6/2006 |
| CN | 1855935 | 11/2006 |
| EP | 1091529 A | 4/2001 |
| EP | 1655885 A | 5/2006 |
| EP | 1771027 A1 | 4/2007 |
| GB | 2366161 A | 2/2002 |
| JP | 2003188912 A | 7/2003 |
| WO | 9956422 | 11/1999 |
| WO | 02099578 A | 12/2002 |

| | | | |
|---|---|---|---|
| WO | 03017543 A1 | 2/2003 | |
| WO | 03032539 A1 | 4/2003 | |
| WO | 03087984 A2 | 10/2003 | |
| WO | 2005101755 A1 | 10/2005 | |
| WO | 2006032583 A1 | 3/2006 | |
| WO | 2006051465 A1 | 5/2006 | |
| WO | 2006056415 A1 | 6/2006 | |

OTHER PUBLICATIONS

Fourcand, Serge F.; U.S. Appl. No. 11/735,590; Title: "Inter-Packet Gap Network Clock Synchronization"; filed Apr. 16, 2007; Specification 44 pgs.; 9 Drawing Sheets (Figs. 1-4, 5A-5B, 6A-6B, 7A-7B, 8 9A-9B, 10-11).

Fourcand, Serge F.; U.S. Appl. No. 11/735,591; Title: "Multiplexed Data Stream Payload Format"; filed Apr. 16, 2007; Specification 41 pgs.; 10 Drawing Sheets (Figs. 1, 2A-2B, 3-7, 8A-8B, 9, 10A-10B, 11-18).

Fourcand, Serge F.; U.S. Appl. No. 11/735,596; Title: "Multi-Frame Network Clock Synchronization"; filed Apr. 16, 2007; Specification 44 pgs.; 9 Drawing Sheets (Figs. 1-4, 5A-5B, 6A-6B, 7A-7B, 8, 9A-9B, 10-11).

Fourcand, Serge F.; U.S. Appl. No. 11/735,598; Title: "Network Clock Synchronization Floating Window and Window Delinieation"; filed Apr. 16, 2007; Specification 43 pgs.; 9 Drawing Sheets (Figs. 1-4, 5A-5B, 6A-6B, 7A-7B, 8, 9A-9B, 10-11).

Fourcand, Serge F.; U.S. Appl. No. 11/735,602; Title: "Multiplexed Data Stream Timeslot Map"; filed Apr. 16, 2007; Specification 41 pgs.; 10 Drawing Sheets (Figs. 1, 2A-2B, 3-7, 8A-8B, 9, 10A-10B, 11-18).

Fourcand, Serge F.; U.S. Appl. No. 11/735,604; Title: "Bandwidth Reuse in Multiplexed Data Stream"; filed Apr. 16, 2007; Specification 40 pgs.; 10 Drawing Sheets (Figs. 1, 2A-2B, 3-7, 8A-8B, 9, 10A-10B, 11-18).

Fourcand, Serge F.; U.S. Appl. No. 11/735,605; Title: "Multiplexed Data Stream Circuit Architecture"; filed Apr. 16, 2007; Specification 41 pgs.; 10 Drawing Sheets (Figs. 1, 2A-2B, 3-7, 8A-8B, 9, 10A-10B, 11-18).

Precise Networked Clock Synchronization Working Group of the IM/ST Committee, IEEE P1588™ D2.2, "Draft Standard for a Precision Clock Synchronization Protocol for Networked Measurement and Control Systems," 2007, 305 pages, IEEE Standards Activities Department, Piscataway, NJ.

Office Action dated May 12, 2009, 15 pages, U.S. Appl. No. 11/737,800, filed Apr. 20, 2007.

Office Action dated Aug. 7, 2009, 10 pages, U.S. Appl. No. 11/735,590, filed Apr. 16, 2007.

Office Action dated Aug. 5, 2009, 21 pages, U.S. Appl. No. 11/739,316, filed Apr. 27, 2007.

Office Action dated Sep. 3, 2009, 15 pages, U.S. Appl. No. 11/735,596, filed Apr. 16, 2007.

Office Action dated Sep. 30, 2009, 9 pages, U.S. Appl. No. 11/735,598, filed Apr. 16, 2007.

Office Action dated Sep. 18, 2009, 13 pages, U.S. Appl. No. 11/735,602, filed Apr. 16, 2007.

Office Action dated Sep. 15, 2009, 13 pages, U.S. Appl. No. 11/735,604, filed Apr. 16, 2007.

Office Action dated Jun. 26, 2009, 15 pages, U.S. Appl. No. 11/737,803, filed Apr. 20, 2007.

Foreign Communication From a Related Counterpart Application—International Search Report and Written Opinion, PCT/CN2008/070037, Apr. 17, 2008, 10 pages.

Foreign Communication From a Related Counterpart Application—International Search Report and Written Opinion, PCT/CN2008/070038, Apr. 17, 2008, 6 pages.

Foreign Communication From a Related Counterpart Application—International Search Report and Written Opinion, PCT/CN2008/070045, Apr. 17, 2008, 7 pages.

Foreign Communication From a Related Counterpart Application—International Search Report and Written Opinion, PCT/CN2008/070046, Apr. 17, 2008, 6 pages.

Foreign Communication From a Related Counterpart Application—International Search Report and Written Opinion, PCT/CN2008/070183, May 8, 2008, 11 pages.

Foreign Communication From a Related Counterpart Application—International Search Report and Written Opinion, PCT/CN2008/070630, Jul. 3, 2008, 8 pages.

Foreign Communication From a Related Counterpart Application—International Search Report and Written Opinion, PCT/CN2008/070690, Jul. 17, 2008, 7 pages.

Foreign Communication From a Related Counterpart Application—International Search Report and Written Opinion, PCT/CN2008/070717, Jul. 24, 2008, 10 pages.

Foreign Communication From a Related Counterpart Application—International Search Report and Written Opinion, PCT/CN2008/070017, Apr. 3, 2008, 6 pages.

Foreign Communication From a Related Counterpart Application—International Search Report and Written Opinion, PCT/CN2008/070005, Apr. 10, 2008, 9 pages.

Foreign Communication From a Related Counterpart Application—International Search Report and Written Opinion, PCT/CN2008/070007, Apr. 17, 2008, 8 pages.

Office Action dated Nov. 23, 2009, 19 pages, U.S. Appl. No. 11/737,800, filed Apr. 20, 2007.

Office Action dated Dec. 30, 2009, 22 pages, U.S. Appl. No. 11/735,590, filed Apr. 16, 2007.

Office Action dated Jun. 9, 2010, 13 pages, U.S. Appl. No. 11/735,590, filed Apr. 16, 2007.

Office Action dated Sep. 23, 2009, 10 pages, U.S. Appl. No. 11/735,591, filed Apr. 16, 2007.

Office Action dated Jan. 6, 2010, 19 pages, U.S. Appl. No. 11/735,591, filed Apr. 16, 2007.

Office Action dated Mar. 25, 2010, 22 pages, U.S. Appl. No. 11/739,316, filed Apr. 27, 2007.

Notice of Allowance dated Aug. 19, 2010, 16 pages, U.S. Appl. No. 11/739,316, filed Apr. 27, 2007.

Office Action dated Feb. 26, 2010, 22 pages, U.S. Appl. No. 11/971,386, filed Jan. 9, 2008.

Office Action dated Feb. 17, 2010, 23 pages, U.S. Appl. No. 11/735,598, filed Apr. 16, 2007.

Notice of Allowance dated Jun. 1, 2010, 8 pages, U.S. Appl. No. 11/735,598, filed Apr. 16, 2007.

Notice of Allowance dated Aug. 24, 2010, 14 pages, U.S. Appl. No. 11/735,598, filed Apr. 16, 2007.

Office Action dated Feb. 22, 2010, 21 pages, U.S. Appl. No. 11/735,602, filed Apr. 16, 2007.

Office Action dated Jul. 29, 2010 15 pages, U.S. Appl. No. 11/735,602, filed Apr. 16, 2007.

Office Action dated Feb. 17, 2010, 24 pages, U.S. Appl. No. 11/735,604, filed Apr. 16, 2007.

Office Action dated Jul. 29, 2010, 15 pages, U.S. Appl. No. 11/735,604, filed Apr. 16, 2007.

Office Action dated Oct. 29, 2009, 9 pages, U.S. Appl. No. 11/735,605.

Office Action dated Mar. 3, 2010, 20 pages, U.S. Appl. No. 11/735,605.

Office Action dated Jun. 22, 2010, 18 pages, U.S. Appl. No. 11/735,605.

Office Action—Notice of Allowance—dated Dec. 29, 2009, 16 pages U.S. Appl. No. 11/737,803, filed Apr. 20, 2007.

Foreign Communication From a Related Counterpart Application—European Search Report, EP Application 08700032.9, Dec. 2, 2009, 7 pages.

Office Action dated Feb. 2, 2010, 23 pages, U.S. Appl. No. 11/735,596, filed Apr. 16, 2007.

Foreign Communication From a Related Counterpart Application—European Application No. 08700032.9, European Office Action dated Jun. 11, 2012, 10 pages.

Foreign Communication From a Related Counterpart Application, Chinese Application 200880001609.3, Chinese Office Action dated Oct. 28, 2011, 4 pages.

Foreign Communication From a Related Counterpart Application, Chinese Application 200880002509.2, Chinese Office Action dated May 19, 2011, 4 pages.

IEEE Standard for Information Technology—Telecommunications and Information Exchange Between Systems—Local and Metropolitan Area Networks—Specific Requirement Part 3: Carrier Sense Multiple Access with Collision Detection (CSMA/CD) Access Method and Physical Layer Specifications—IEEE Computer Society, IEEE Std. 802.3-2008, Dec. 26, 2008—Section 1.

IEEE Standard for Information Technology—Telecommunications and Information Exchange Between Systems—Local and Metropolitan Area Networks—Specific Requirement Part 3: Carrier Sense Multiple Access with Collision Detection (CSMA/CD) Access Method and Physical Layer Specifications—IEEE Computer Society, IEEE Std. 802.3-2008, Dec. 26, 2008—Section 2.

IEEE Standard for Information Technology—Telecommunications and Information Exchange Between Systems—Local and Metropolitan Area Networks—Specific Requirement Part 3: Carrier Sense Multiple Access with Collision Detection (CSMA/CD) Access Method and Physical Layer Specifications—IEEE Computer Society, IEEE Std. 802.3-2008, Dec. 26, 2008—Section 3.

IEEE Standard for Information Technology—Telecommunications and Information Exchange Between Systems—Local and Metropolitan Area Networks—Specific Requirement Part 3: Carrier Sense Multiple Access with Collision Detection (CSMA/CD) Access Method and Physical Layer Specifications—IEEE Computer Society, IEEE Std. 802.3-2008, Dec. 26, 2008—Section 4.

IEEE Standard for Information Technology—Telecommunications and Information Exchange Between Systems—Local and Metropolitan Area Networks—Specific Requirement Part 3: Carrier Sense Multiple Access with Collision Detection (CSMA/CD) Access Method and Physical Layer Specifications—IEEE Computer Society, IEEE Std. 802.3-2008, Dec. 26, 2008—Section 5.

Krzyanowski, "Lectures on Distributed Systems Clock Synchronization," Rutgers University—CS 417: Distributed Systems, copyright 2000-2009, 14 pages.

Office Action dated May 24, 2011, 14 pages, U.S. Appl. No. 11/735,604, filed Apr. 16, 2007.

Office Action dated Jan. 11, 2011, 10 pages, U.S. Appl. No. 11/735,590, filed Apr. 16, 2007.

Office Action dated Feb. 1, 2011, 10 pages, U.S. Appl. No. 11/735,590, filed Apr. 16, 2007.

Office Action dated Jun. 3, 2011, 8 pages, U.S. Appl. No. 11/735,590, filed Apr. 16, 2007.

Office Action dated Jan. 13, 2011, 10 pages, U.S. Appl. No. 11/735,591, filed Apr. 16, 2007.

Office Action dated Jun. 17, 2011, 12 pages, U.S. Appl. No. 11/735,591, filed Apr. 16, 2007.

Office Action dated Jul. 1, 2011, 10 pages, U.S. Appl. No. 11/737,800, filed Apr. 20, 2007.

Notice of Allowance dated Jul. 19, 2010, 12 pages, U.S. Appl. No. 11/971,386, filed Jan. 9, 2008.

Office Action dated Jun. 9, 2011, 17 pages, U.S. Appl. No. 11/735,596, filed Apr. 16, 2007.

Notice of Allowance dated Apr. 11, 2011 7 pages, U.S. Appl. No. 11/735,602, filed Apr. 16, 2007.

Office Action dated Oct. 27, 2010, 14 pages, U.S. Appl. No. 11/735,605.

Office Action—Notice of Allowance—dated Mar. 17, 2011, 9 pages, U.S. Appl. No. 11/735,605.

Foreign Communication from a counterpart application, Chinese application 200880001140.3, Office Action dated Feb. 9, 2011, 5 pages.

Foreign Communication from a counterpart application, Chinese application 200880001140.3, Partial English Translation Office Action dated Feb. 9, 2011, 7 pages.

Foreign Communication from a counterpart application, Chinese application 200880000770.9, Office Action dated Dec. 14, 2010, 7 pages.

Foreign Communication from a counterpart application, Chinese application 200880000770.9, Partial English Translation Office Action dated Dec. 14, 2010, 6 pages.

Foreign Communication From a Related Counterpart Application—European Application No. 08700043.6, European Office Action dated Jul. 20, 2012, 7 pages.

Notice of Allowance dated Aug. 13, 2012, 25 pages, U.S. Appl. No. 11/735,591, filed Apr. 16, 2007.

Office Action dated Aug. 6, 2012, 25 pages, U.S. Appl. No. 11/735,596, filed Apr. 16, 2007.

Notice of Allowance dated Jul. 30, 2012, 42 pages, U.S. Appl. No. 12/691,372, filed Jan. 21, 2010.

Foreign Communication From a Related Counterpart Application, European Application 08700043.6, European Office Action dated Oct. 29, 2009, 7 pages.

Office Action dated May 25, 2012, 15 pages, U.S. Appl. No. 11/737,800, filed Apr. 20, 2007.

Office Action dated Jun. 20, 2012, 44 pages, U.S. Appl. No. 13/271,691, filed Oct. 12, 2011.

Notice of Allowance dated Jun. 19, 2012, 11 pages, U.S. Appl. No. 11/735,590, filed Apr. 16, 2007.

National Instruments, "Introduction to Distributed Clock Synchronization and the IEEE 1588 Precision Time Protocol," http://zone.ni.com/devzone/cda/tut/p/id/2822, May 14, 2008, pp. 1-4.

Pratt, G., et al., "Distributed Synchronous Clocking," IEEE Transactions on Parallel and Distributed Systems, vol. 6, No. 3, Mar. 1995, pp. 314-328.

Wikipedia, "TTEthernet," http://en.wikipedia.org/wiki/TTEthernet, Retrieved Dec. 22, 2011.

Office Action dated Mar. 6, 2012, 13 pages, U.S. Appl. No. 11/735,591, filed Apr. 16, 2007.

Office Action dated Nov. 21, 2011, 4 pages, U.S. Appl. No. 11/737,800, filed Apr. 20, 2007.

Office Action dated Oct. 25, 2011, 11 pages, U.S. Appl. No. 11/735,596, filed Apr. 16, 2007.

Office Action dated Apr. 24, 2013, 43 pages, U.S. Appl. No. 13/162,803, filed Jun. 17, 2011.

Foreign Communication From a Related Counterpart Application, Chinese Application 200880000770.9, Chinese Office Action dated Mar. 19, 2013, 8 pages.

Foreign Communication From a Related Counterpart Application, Chinese Application 200880000770.9, Partial English Translation Office Action dated Mar. 19, 2013, 7 pages.

Fourcand, Serge Francois; U.S. Appl. No. 13/624,625; Title: "Inter-Packet Gap Network Clock Synchronization"; Filing Date: Sep. 21, 2012.

Fourcand, Serge F.; U.S. Appl. No. 13/649,820; Title: "System for TMD Data Transport Over Ethernet Interfaces"; Filing Date: Oct. 11, 2012.

Office Action dated Aug. 21, 2012, 17 pages, U.S. Appl. No. 11/737,800, filed on Apr. 20, 2007.

Final Office Action dated Jan. 4, 2013, 27 pages, U.S. Appl. No. 13/271,691, filed Oct. 12, 2011.

Final Office Action dated Jan. 14, 2013,15 pages, U.S. Appl. No. 11/735,596, filed Apr. 16, 2007.

Office Action dated Oct. 16, 2012, 40 pages, U.S. Appl. No. 12/862,521, filed Aug. 24, 2012.

Notice of Allowance dated Oct. 16, 2012, 42 pages U.S. Appl. No. 12/691,367, filed Jan. 21, 2010.

Office Action dated Feb. 1, 2013, 4 pages, U.S. Appl. No. 12/862,521, filed Aug. 24, 2010.

Foreign Communication From a Related Counterpart Application, Chinese Application 200880000770.9, Office Action dated Oct. 9, 2012, 5 pages.

Foreign Communication From a Related Counterpart application, Chinese application 200880000770.9, Partial English Translation Office Action dated Oct. 9, 2012, 5 pages.

Office Action dated Mar. 13, 2013, 27 pages, U.S. Appl. No. 11/737,800, filed Apr. 20, 2007.

Office Action dated Apr. 3, 2013, 58 pages, U.S. Appl. No. 12/842,794, filed Jul. 23, 2010.

* cited by examiner

| Octet | Bit | | | | | | | |
|---|---|---|---|---|---|---|---|---|
| | 0 | 1 | 2 | 3 | 4 | 5 | 6 | 7 |
| 0 | LSB E-Sync Timestamp (00:07) ||||||||
| 1 | E-Sync Timestamp (08:15) ||||||||
| 2 | MSB E-Sync Timestamp (16:23) ||||||||
| 3 | Clock Quality (0:4) ||||| Req = 0  Ack = 1 | Sync = 0  TDM = 1 | Parity 1 |
Fig. 4
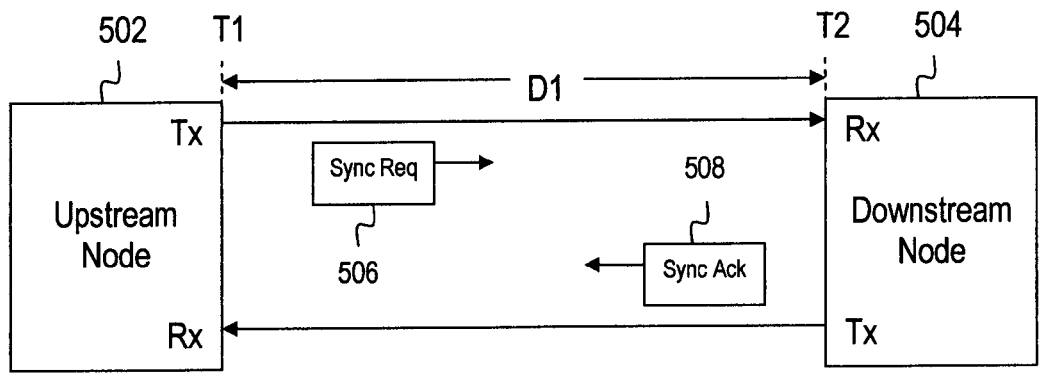
Fig. 5A
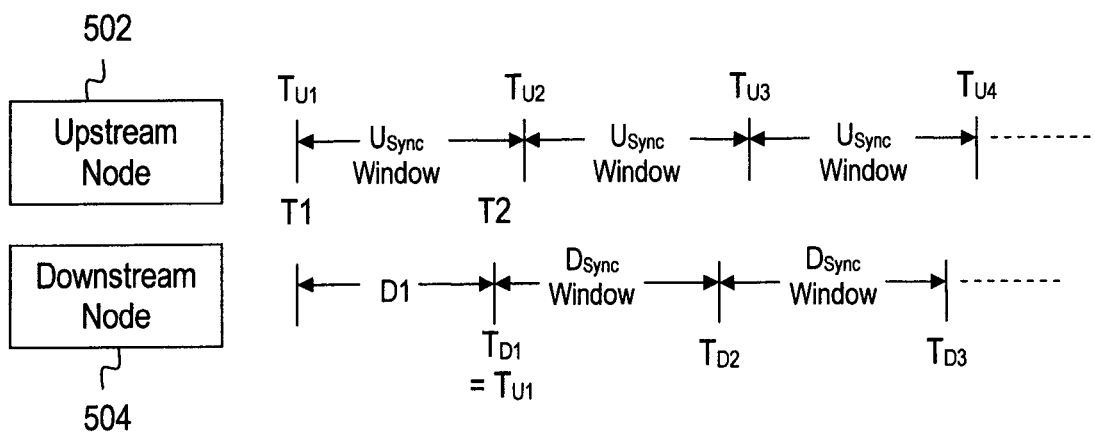
Fig. 5B

| Octet | Bit | | | | | | | |
|---|---|---|---|---|---|---|---|---|
| | 0 | 1 | 2 | 3 | 4 | 5 | 6 | 7 |
| 0 | LSB T-Sync Timestamp (00:07) | | | | | | | |
| 1 | T-Sync Timestamp (08:15) | | | | | | | |
| 2 | MSB T-Sync Timestamp (16:23) | | | | | | | |
| 3 | Clock Quality (0:4) | | | | | Open | | Parity 2 |
| 4 | LSB T-FC Timestamp (00:07) | | | | | | | |
| 5 | MSB T-FC Timestamp (08:15) | | | | | | | |
| 6 | Open | | | | | | | Parity 3 |

Fig. 8

NETWORK CLOCK SYNCHRONIZATION TIMESTAMP

CROSS-REFERENCE TO RELATED APPLICATIONS

This application claims the benefit of U.S. Provisional Application Ser. No. 60/826,764 filed Sep. 25, 2006 and entitled "System for TDM Data Transport Over Ethernet Interfaces," U.S. Provisional Application Ser. No. 60/857,741 filed Nov. 8, 2006 and entitled "TDM Data Transport Over Ethernet," and U.S. Provisional Application Ser. No. 60/886,833 filed Jan. 26, 2007 and entitled "Closed Loop Clock Synchronization," all of which are by Serge F. Fourcand and are incorporated herein by reference as if reproduced in their entirety.

This application is related to U.S. patent application Ser. No. 11/735,590 entitled "Inter-Packet Gap Network Clock Synchronization," U.S. patent application Ser. No. 11/735,596 entitled "Multi-Frame Network Clock Synchronization," and U.S. patent application Ser. No. 11/735,598 entitled "Network Clock Synchronization Floating Window and Window Delineation," all of which are by Serge F. Fourcand, are filed concurrently herewith, and are incorporated herein by reference as if reproduced in their entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Ethernet is the preferred protocol for many types of networks because it is flexible, decentralized, and scalable. Ethernet is flexible in that it allows variable-sized data packets to be transported across different types of mediums using various nodes each having different transmission speeds. Ethernet is decentralized in that it allows the end devices to transmit and receive data without oversight or intervention from a centralized server or party. Furthermore, Ethernet is scalable in that it can be implemented in both small-scale and large-scale networks. These advantages make Ethernet a preferred choice for data distribution in many computer networks.

Unfortunately, Ethernet does have some drawbacks. When Ethernet packets are transported through the network, the Ethernet packets contend with other traffic being transported over the same links or through the same nodes. The contentious traffic not only includes packets bound for the same destination, but also packets bound for other destinations that are transported over the same link or through the same node as the Ethernet packet. This contention produces burstiness and jitter at the nodes within the network. Some of these problems can be addressed by using resource arbitration and buffers at the nodes, and by prioritizing the packets into high priority data and low priority data. However, these solutions increase network complexity, increase delay, and detract from the inherent advantages of Ethernet.

The aforementioned drawbacks are part of the reason Ethernet has not been widely implemented in networks carrying time division multiplexed (TDM) data. Specifically, Ethernet does not provide a sufficient Quality of Service (QoS) to meet the stringent jitter and data loss requirements for voice traffic in the public switched telephone network (PSTN) and other TDM networks. Instead, TDM traffic is carried by highly synchronized networks, such as synchronous optical networks (SONET) and synchronous digital hierarch (SDH) networks. Various Ethernet enhancements, such as circuit emulation, provider backbone transport, and pseudowires, have been proposed to address the jitter and data loss issues, but these enhancements fail to couple the flexibility of Ethernet with the high QoS requirements of TDM networks. Thus, a need exists for an improved Ethernet protocol that is flexible, easy to implement, supports the QoS requirements of TDM networks, and is compatible with existing technology.

SUMMARY

In one aspect, the disclosure includes a network component comprising at least one processor configured to promote transmission of a frame from a first node to a second node, the frame comprising a first clock synchronization data, and a first frame count, wherein the first clock synchronization data and the first frame count are used to synchronize a first clock in the first node and a second clock in the second node.

In another aspect, the disclosure includes a method comprising processing a frame comprising an Ethernet control symbol that delineates the beginning of the frame, a first clock synchronization data, a first frame count, and a second clock synchronization data.

In a third aspect, the disclosure includes an Ethernet node comprising at least one processor configured to synchronize a clock using a clock synchronization data comprising a first timestamp, a first frame count, a second timestamp, and a second frame count.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 4 is an illustration of an embodiment of a synchronization timestamp format.

FIG. 5A is an illustration of an embodiment of a process of establishing synchronized communication.

FIG. 5B is an illustration of an embodiment of a timeline for establishing synchronized communication.

FIG. 8 is an illustration of another embodiment of a synchronization timestamp format.

DETAILED DESCRIPTION

Figure 1:
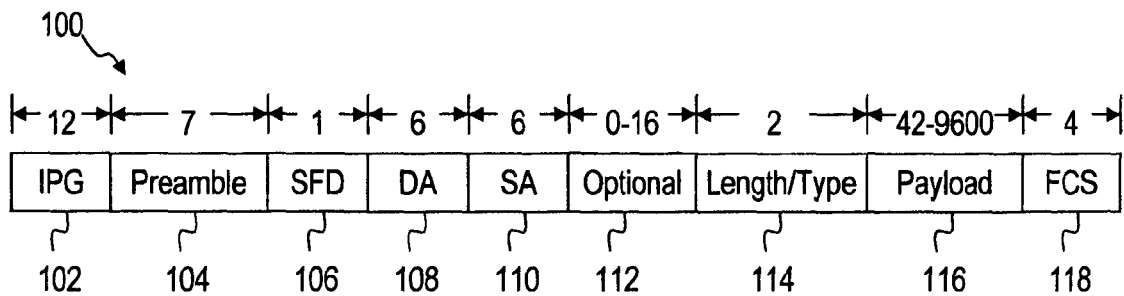
FIG. 1 is an illustration of an embodiment of an Ethernet MAC frame.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques described below, including the exemplary designs and implementations illustrated and described herein, but may be modified within the scope of the appended claims along with their full scope of equivalents.

Synchronization of nodes across a network has many practical applications. For example, it is preferable that all of the audio channels be synchronized to each other in sports stadiums or other large venues. In addition, at large venues there may be a video screen that provides visualizations along with the audio presentation. In this case, it may be important that not only the audio channels be all synchronized to each other but also to the video display. Another application of synchronization may be for multiple people to work remotely in real-time together. For example, each musician in a band may be remotely located from each other while having a recording session at a remote recording studio. In this example, the music produced by each musician may be synchronized together to be recorded at the remote recording studio. Many other applications that have already been envisioned and have yet to be envisioned are enabled through synchronized communication.

The inclusion of clock synchronization data in the Ethernet packets has been previously addressed. For example, IEEE 1588 specifies that timestamps may be added to packets to communicate a timestamp between nodes in the network. However, including the timestamp within the packet creates the problem of accurately indicating the packet's transmission time, e.g. the time that the packet is sent. The transmission time may be inaccurate because the timestamp has to be processed and encapsulated within a packet, a process that delays the transmission of the packet in an unpredictable manner. Specifically, delays caused by the insertion of the timestamp into the packet and by implementing carrier sense multiple access with collision avoidance (CSMA/CA) may cause the timestamp to become stale. These delays are unpredictable in that they vary based on the packet, the node, and other network conditions. Similarly, upon receiving a timestamp at a downstream node, further delays may be incurred when the packet is buffered and/or processed to extract the timestamp. To compensate for these delays, IEEE 1588 specifies that a follow-up timestamp be communicated to a downstream node to indicate the precise time when the initial timestamp was communicated. Unfortunately, the prior art methods for clock synchronization are bandwidth limiting due to multiple packets being communicated from the upstream nodes to the downstream nodes. Further, the prior art methods for clock synchronization do not take into account internal processing delays at the downstream node.

Disclosed herein are multiple operational modes that provide clock synchronization between nodes in an Ethernet network, which may be referred to herein as Huawei-Enhanced (HE) Ethernet operational modes. A first operational mode is frequency-synchronized communication mode, also referred to as a Huawei synchronized (H-Sync) operational mode. The H-Sync operational mode places a timestamp in the inter-packet gap (IPG) between two Ethernet packets. The timestamp may be used to indicate the start of a predefined periodic synchronization window that enables frequency-synchronized communication between two Ethernet nodes. The inclusion of the timestamp in the IPG may not be bandwidth limiting because the IPG is an idle period in standard Ethernet communication. Adding the timestamp to the IPG rather than to an Ethernet packet allows the nodes to process the timestamp without having to process an entire packet.

A second operational mode is a frequency-synchronized and phase-aligned communication mode, also referred to as a Huawei Time Division Multiplexed (H-TDM) operational mode. The H-TDM operational mode defines an overlay synchronous timeslot scheme that multiplexes octet-sized timeslots of timestamp, control, and payload data within a predefined synchronization window. The payload data can include any of voice data, high priority data such as video data, and best-effort packet data. The overlay synchronous timeslot scheme enables deterministic transfer of high priority data without contention, and thus supports the stringent QoS requirements of the PSTN. The timestamp data contained in the overlay synchronous timeslot scheme includes a forward timestamp that establishes the start of the predefined synchronization window, which enable frequency-synchronized communication, and a loop-back timestamp that compensates for transmission delays, which enables phase-aligned communication between two Ethernet nodes.

FIG. 1 illustrates one embodiment of an Ethernet packet 100. The packet 100 begins with a preamble 104, which may be about seven octets of a repeated pattern, such as "10101010." The preamble 104 may allow a node's physical layer signaling (PLS) circuitry to reach steady-state synchronization with the packet's timing. The preamble 104 may be followed by a start of frame delimiter (SFD) 106, which may be a single octet with the pattern "10101011," and may be used to indicate the start of the packet 100. The destination address (DA) 108 may specify the address of the destination node for which the packet 100 is intended, and may be about six octets. The source address (SA) 110 may specify the address of the source node from which the packet 100 originated, and may be about six octets. The packet 100 may contain a plurality of optional octets 112 that are used to associate the packet 100 with a type protocol identifier (TPID) and/or a virtual local area network identifier (VID). For example, up to about sixteen octets may be used for associating the packet 100 with a TPID and a VID, for example, as described in IEEE 802.1Q.

The packet 100 continues with a length/type field 114, which may specify the length of the payload and the Ethernet protocol being used, and may be about two octets. The payload 116 may be a variable-sized field that carries a data payload. Although the payload 116 may contain any amount of data, in specific embodiments the payload 116 may contain from about 42 octets to about 1,500 octets in standard packets, and may contain from about 9,000 octets to about 12,000 octets in jumbo packets. The frame check sequence (FCS) 118 may be used for error detection, and may be a four-octet field that contains a cyclic redundancy check (CRC) value calculated using the contents of the packet 100. Although not part of the packet 100, the IPG 102 may be data or idle characters that separate the packets 100. The IPG 102 may contain about twelve octets of idle control characters, although any amount of data or idle characters may be used in the IPG 102.

Figure 2:
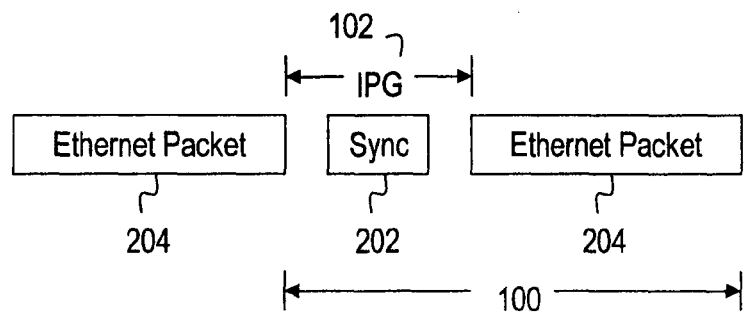
FIG. 2 is an illustration of an embodiment of an Ethernet data stream.

As illustrated in FIG. 2, a synchronous timestamp (Sync) 202 may be inserted in the IPG 102 between two packets 204. The Sync 202 may be used to synchronize an upstream node's clock with a downstream node's clock in the H-Sync operational mode. Specifically, the Sync 202 may be a four-octet packet that synchronizes the two clocks in frequency, but does not necessarily align the clocks in phase. The Sync 202 may also indicate the start of a synchronization window having a predetermined period, such as about 125 microseconds (μs). The Sync 202 need not be located in every IPG 102, but in some embodiments, it may be advantageous to have at least one Sync 202 during every synchronization window.

In some embodiments, there are advantages to inserting the timestamp in the IPG 102. For example, the H-Sync timestamp does not affect the available bandwidth because the Sync 202 is located in the IPG 102, which is an idle period in standard Ethernet communications. Further, communicating the timestamp in the IPG 102, rather than within the packet 100, allows the timestamp to be transmitted independent of the packet 100. The independent transmission of the Sync 202 and the packet 100 ensures that the timestamp will not become stale, and allows the upstream and downstream nodes' clocks to be synchronized without transmitting multiple timestamps from the upstream node to the downstream node. Similarly, upon receiving the timestamp at a downstream node, the timestamp may be extracted and processed without processing the packet 100.

Clock accuracy is a consideration when synchronizing clocks between Ethernet nodes. Most clocks have imperfect frequency sources that lead to imperfect clock accuracy. Currently, IEEE 802.3 requires that the accuracy of a free-running oscillator sourcing the frequency base for an Ethernet interface to be ±100 parts per million (ppm), where the ppm indicates how much offset an oscillator will have for a given frequency over a given time period. A clock with ±100 ppm accuracy has a free-running oscillator that may be ahead (+) by 100 ppm or behind (−) by 100 ppm, resulting in a possible 200 ppm range of accuracy for a two-way Ethernet communication. As an example, a transmitting Ethernet interface oscillator may be ahead by 100 ppm and a receiving Ethernet interface oscillator may be behind by 100 ppm. Thus, if each clock has a one-second frequency with ±100 ppm accuracy, they will each be offset by as much as about 8.64 seconds over the course of a day. To better support the operational modes described herein and future development, e.g. 100 Gigabit Ethernet, the accuracy requirement of a free-running oscillator sourcing the frequency base for an Ethernet interface may be increased to be ±about 20 ppm. Thus, a clock with a one-second frequency and ±20 ppm accuracy may reflect an offset of about 1.728 seconds over the course of a day. When the requirement for a free-running oscillator sourcing the frequency base for an Ethernet interface is ±about 20 ppm or better, the Ethernet interface may be said to be operating in a Huawei-Ethernet (H-Eth) operational mode.

Figure 3:
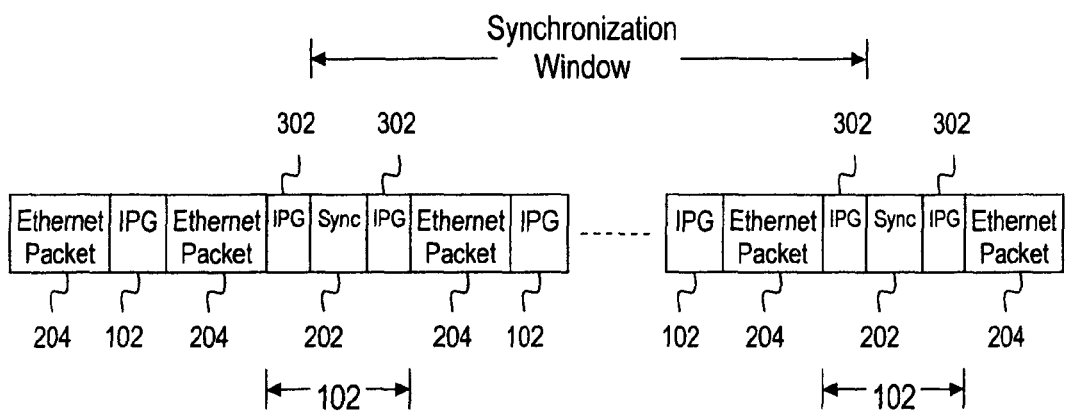
FIG. 3 is an illustration of another embodiment of the Ethernet data stream.

FIG. 3 illustrates an embodiment in which at least one Sync 202 is included in a synchronization window. The Sync 202 is used to mitigate the effects of clock inaccuracy, and may be included in each synchronization window. For example, if the synchronization period is about 125 μs, then the Sync 202 is communicated at least once about every 125 μs. A network node may maintain a timer that indicates when the next Sync 202 should be communicated to ensure communication of the Sync 202 at least once within every synchronization window. Within the synchronization window, the communication of packets 100 may proceed as normal. Although not illustrated in FIG. 3, in some embodiments there may be a plurality of Syncs 202 between two packets. For example, there may be two or more Syncs 202 between two packets when the Syncs 202 are communicated at least once every 125 μs and the time period between the end of one packet and the beginning of a subsequent packet is more than 125 μs. Persons of ordinary skill in the art will be aware of other instances when there will be a plurality of Syncs 202 between packets.

FIG. 3 also illustrates the placement of the Sync 202 within the IPG 102. Although the Sync 202 may be inserted anywhere within the IPG 102, some specific locations may be preferred. For example, the Sync 202 may be inserted into the center of the IPG 102 such that an equal number of idle octets 302 are present before and after the Sync 202. Specifically, if the IPG 102 is twelve octets long, then the Sync 202 may be inserted in the middle four octets 302, with four octets 302 preceding and four octets 302 following the Sync 202. Another example is that the Sync 202 may be placed within the IPG 102 such that at least two idle octets 302 are located between the Sync 202 and the previous or next packet 100. Alternatively, the Sync 202 may be inserted at the beginning of the IPG 102, at the end of the IPG 102, or at any other location within the IPG 102.

FIG. 4 illustrates one embodiment of the Sync 202. Specifically, FIG. 4 illustrates a four octet Sync 202 where each row represents an octet and each column represents the position of the bits within each octet. The octets may be arranged in order of significance from top to bottom such that the least significant octet, octet 0, is at the top and the most significant octet, octet 3, is at the bottom. Similarly, the bits may be arranged in order of significance from left to right, such that the least significant bit (LSB) of each octet, bit 0, is at the left and the most significant bit (MSB) of each octet, bit 7, is at the right. As is common in Ethernet communications, data may be communicated from the LSB to the MSB and from least significant octet to most significant octet, such that the bits are communicated row-by-row from left to right starting with the top octet and ending with the bottom octet.

The first three octets in the Sync 202 may be a twenty-four bit timestamp. Specifically, octet 0 may contain the LSBs of the twenty-four bit timestamp, which may be bits 00 through 07 of the timestamp located in bit 0 through bit 7 of octet 0. Octet 1 may contain the next eight bits of the twenty-four bit timestamp, which may be bits 08 through 15 of the timestamp located in bit 0 through bit 7 of octet 1. Octet 2 may contain the MSBs of the twenty-four bit timestamp, which may be bits 16 through 23 of the timestamp located in bit 0 through bit 7 of octet 2. With twenty-four bits available for the timestamp, each bit may represent a timestamp resolution of about 0.01 nanoseconds (ns) for a total range of about 167.772 μs. When the synchronization windows have a period of about 125 μs, then each bit may represent a timestamp resolution as low as about 7.451 picoseconds (ps) and still cover the full range of the 125 μs window. In some embodiments, more or less bits may be used in the timestamp. For example, if sixteen bits were used in the timestamp, then the size of the Sync 202 would be reduced to three octets, and each bit would represent a timestamp resolution of about two nanoseconds (ns) for a range of about 131.072 μs. Persons of ordinary skill in the art will recognize the proper balance of the number of bits used in the timestamp and the timestamp resolution represented by each bit to cover a given timestamp range for a given network.

The fourth octet in the Sync 202 may be control information. The control information may be used to initiate frequency-synchronized communication between an upstream node and a downstream node. The first five bits, bit 0 through bit 4, may indicate the clock quality of the node that is initiating the synchronization request, e.g. the upstream node. The sixth bit, bit 5, may indicate whether the Sync 202 is a request for frequency-synchronized communication or an acknowledgment of a previous request for frequency-synchronized communication. In embodiments, bit 5 is set to "0" when the Sync 202 is a request for frequency-synchronized communication, and bit 5 is set to "1" when the Sync 202 is an acknowledgment of a previous request for frequency-synchronized communication. The seventh bit, bit 6, may indicate the operational mode that is being requested or acknowledged. In embodiments, bit 6 is set to "0" when the H-Sync operational mode is being requested or acknowledged, and bit 6 is set to "1" when the H-TDM operational mode is being requested or acknowledged. The last bit, bit 7, may be used as a parity bit for verifying the integrity of the Sync 202.

FIG. 5A illustrates an exemplary block diagram of the process for initiating the frequency-synchronized communication between two nodes. The process may begin when a synchronization request 506 is sent from an upstream node 502 to a downstream node 504 at time T1. The synchronization request 506 may have the format of the Sync 202 illustrated in FIG. 4, where the timestamp indicates time T1. The synchronization request 506 may also have bit 5 of octet 3 set to "0" and bit 6 of octet 3 set to "0" to indicate that the synchronization request 506 is a request for the H-Sync operational mode. Concurrently, the upstream node 502 may initiate its synchronization window. If the downstream node 504 supports the H-Sync operational mode, then the downstream node 504 will receive and process the synchronization request 506 at time T2. Specifically, the downstream node 504 may use the timestamp to create a synchronization window that is frequency-synchronized to a corresponding synchronization window in the upstream node 502. Both synchronization windows may have a period of about 125 μs.

The downstream node 504 may synchronize its synchronization window with the timestamp using various methods. Specifically, the downstream node 504 may frequency-synchronize its synchronization window to a corresponding synchronization window in the upstream node 502 by setting its clock equal to the timestamp. For example, upon receiving the synchronization request 506 with the timestamp T1, the downstream node 504 may set its clock to time T1. Alternatively, the downstream node 504 may record an offset between its clock and the timestamp, which allows the downstream node 504 to be frequency-synchronized to multiple nodes. For example, in addition to being downstream from the upstream node 502, the downstream node 504 may also be downstream from another node, node A. Specifically, the upstream node 502 and node A may be connected to different ports on the downstream node 504. In this case, the downstream node 504 may maintain a first clock offset, thereby enabling frequency-synchronized communication with the upstream node 502, and maintain a second clock offset, thereby enabling frequency-synchronized communication with upstream node A. Maintaining a separate offset for each port may be beneficial when the downstream node 504 communicates with a plurality of other network nodes via a plurality of ports.

If the downstream node 504 supports the H-Sync operational mode, the downstream node 504 may send a synchronization acknowledgement 508 to the upstream node 502. The synchronization acknowledgement 508 may have the format of the Sync 202 illustrated in FIG. 4 with bit 5 of octet 3 set to "1" and with bit 6 of octet 3 set to "0," thereby indicating that the synchronization acknowledgement 508 is an acknowledgement of the H-Sync operational mode. In addition, the synchronization acknowledgement 508 may contain the timestamp received from the upstream node 502. Specifically, the timestamp in the synchronization acknowledgement 508 may be set to time T1. The inclusion of the original timestamp, e.g. T1 from the synchronization request 506, in the synchronization acknowledgement 508 allows the upstream node 502 to correlate the synchronization request 506 with the synchronization acknowledgement 508. The upstream node 502 may then interpret the synchronization acknowledgement 508 as an indication that the H-Sync operational mode has been established. This timestamp loopback from the downstream node 504 to the upstream node 502 allows the upstream node 502 and the downstream node 504 to be frequency synchronized, that is offset in time from each other by a consistent amount of time.

The synchronization request 506 does not affect nodes that do not support the H-Sync operational mode. Specifically, if the downstream node 504 does not support the H-Sync operational mode, then the downstream node 504 will view the synchronization request 506 as random data in the IPG, and will ignore and/or discard the synchronization request 506. If the upstream node 502 does not receive a response to the synchronization request within a predetermined amount of time, the upstream node 502 may determine that the H-Sync operational mode is not supported by the downstream node 504. Because nodes that do not support the H-Sync operational mode ignore and/or discard the synchronization request 506, backwards compatibility may be enabled such that the nodes that support the H-Sync operational mode may revert to standard Ethernet protocols to communicate with the nodes that do not support the H-Sync operational mode.

In some instances, the downstream node 504 may send a second synchronization request, rather than the synchronization acknowledgment 508, to the upstream node 502. For example, the downstream node 504 may determine that it has a higher quality clock by comparing its clock quality to the indication of the upstream node's clock quality found in the first five bits of the fourth octet of the synchronization request 506. In such a case, the downstream node 504 may initiate its own synchronization request 506 that contains the downstream node's higher clock quality in the first five bits of the fourth octet. Alternatively, the downstream node 504 may support another operational mode, such as the H-TDM operational mode. In such a case, the downstream node 504 may initiate its own synchronization request with bit 5 of octet 3 set to "0" and bit 6 of octet 3 set to "1," so as to request the H-TDM operational mode. In either case, if the upstream node 502 does not support the requested feature, e.g. the higher clock quality or the H-TDM operational mode, the upstream node 502 will not acknowledge the downstream node's request. After a predetermined time of not receiving an acknowledgment to its request, the downstream node 504 will determine that the upstream node 502 does not support the requested feature, and will acknowledge the original synchronization request 506.

FIG. 5B illustrates a timeline of one embodiment of the frequency-synchronized communication between the upstream node 502 and the downstream node 504. Specifically, FIG. 5B contains a separate timeline for the upstream node 502 and the downstream node 504, where the timelines represent time relative to the corresponding node. The time relative to the upstream node 502 is shown above the timeline for the upstream node 502 and indicated by $T_{Ux}$, where x is an integer. Similarly, the time relative to the downstream node 504 is shown below the timeline for the downstream node 504 and indicated by $T_{Dx}$, where x is an integer. An absolute time is shown between the two timelines and indicated by Tx, where x is an integer. The time relative to the upstream node 502 and the time relative to the downstream node 504 may not necessarily be equal to the absolute time.

At time T1, the upstream node 502 may communicate the synchronization request 506 to the downstream node 504 and initiate a synchronization window. The synchronization request 506 may include a timestamp that indicates the time that the synchronization request 506 was transmitted from the upstream node 502. Because the timestamp was created by the upstream node 502, the timestamp indicates the synchronization request transmission time relative to the upstream node 502, e.g. time $T_{U1}$. Concurrent with the transmission of the synchronization request 506, the upstream node 502 initiates an upstream synchronization window, $U_{Sync}$ Window, with a predetermined period, such as 125 μs. Upon initiating the $U_{Sync}$ Window, time in the upstream node 502 may be measured relative to start of the current $U_{Sync}$ Window. Specifically, a new $U_{Sync}$ Window is initiated after every predetermined period, e.g. at each of times $T_{U2}$, $T_{U3}$, and $T_{U4}$.

At time T2, the downstream node 504 receives the synchronization request 506 and performs various actions. When the synchronization request 506 is received, the downstream node 504 may synchronize its clock to the timestamp in the synchronization request 506, e.g. time $T_{U1}$. For example, the downstream node clock may be reset such that time relative to the downstream node 504, $T_{D1}$, is equal to $T_{U1}$. In addition to synchronizing its clock, the downstream node 504 may initiate a downstream synchronization window $D_{Sync}$ Window, with the same predetermined period as the $U_{Sync}$ Window. Upon initiating the $D_{Sync}$ Window, time in the downstream node 504 may be measured relative to start of the current $D_{Sync}$ Window. Specifically, a new $D_{Sync}$ Window is initiated after every predetermined period, e.g. at each of times $T_{D2}$, $T_{D3}$, and so forth. Thus, the $D_{Sync}$ Windows are frequency-synchronized to the $U_{Sync}$ Windows. Upon processing the synchronization request 506, the downstream node 504 may transmit a synchronization acknowledgment 508 at time T2, thereby informing the upstream node 502 that the H-Sync operational mode has been successfully established.

While the $U_{Sync}$ Windows and the $D_{Sync}$ Windows are frequency-synchronized, they are not necessarily phase-aligned. As shown in FIG. 5B, there may be a transmission delay, D1, when communicating the synchronization request 506 from the upstream node 502 to the downstream node 504. The transmission delay D1 causes in the phase misalignment between the $U_{Sync}$ Windows and the $D_{Sync}$ Windows. For example, the first $U_{Sync}$ Window may be started at time T1, whereas the first $D_{Sync}$ Window may be started at time T2, which may be equal to T1 plus D1. While a particular transmission delay D1 may be depicted in FIG. 5B, it may be contemplated that shorter or longer delays may occur between the upstream node 502 and the downstream node 504. For example, the $D_{Sync}$ Windows may be offset from the $U_{Sync}$ Windows by less than a single synchronization period, by more than a single synchronization window, or by x synchronization periods, where x is a number such as an integer.

The H-TDM operational mode is more complex than the H-Sync operational mode. Specifically, the H-TDM operational mode provides an overlay synchronous timeslot scheme that allows the H-TDM operational mode to transport various types of data over a standard Ethernet Physical Layer interface. The overlay synchronous timeslot scheme may support higher QoS levels than is possible with previous Ethernet solutions. Moreover, the H-TDM operational mode can be used to frequency-synchronize and phase-align two Ethernet nodes. Specifically, the H-TDM timestamp allows the upstream node 502 and the downstream node 504 to initiate, synchronize, and phase-align their synchronization windows, thereby increasing the precision of the communication between the upstream node 502 and downstream nodes 504. Further, the H-TDM operational mode is configured such that the integrity of the data is maintained when some of the data at the beginning or the end of the window is lost.

The overlay synchronous timeslot scheme may allow the H-TDM frame to transport a variety of data types. When the synchronization window has a period of about 125 μs, each of the timeslots in the overlay synchronous timeslot scheme represents a single channel with about 64 kilobits per second (Kbps) of bandwidth. These channels provide sufficient bandwidth to carry a voice conversation compatible with the public switched telephone network (PSTN). Thus, voice channels that are carried in the overlay synchronous timeslot scheme in an H-TDM frame may be referred to as TDM traffic. The overlay synchronous timeslot scheme also provides octet-sized granularity for enabling communication of other traffic with stringent quality of service (QoS) requirements, referred to herein as High-Performance Flow (HPF) traffic. Examples of HPF traffic include video, audio, and other multimedia traffic. HPF traffic may be assigned multiple channels with single-octet granularity according with bandwidth requirements of the HPF traffic. In other words, each channel assigned to a HPF increases the bandwidth allocated to the HPF by 64 Kbps. For example, a low resolution streaming video HPF requiring about 256 Kbps of bandwidth may be assigned about four channels from the H-TDM frame. Similarly, a HPF requiring about 3.2 megabits per second (Mbps) of bandwidth may be assigned about fifty channels from the H-TDM frame.

Figure 6A:
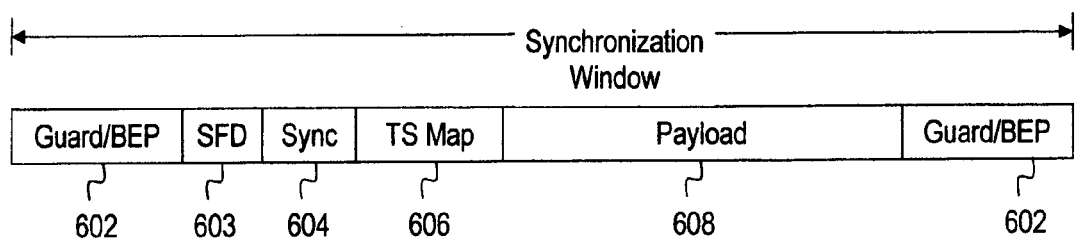
FIG. 6A is an illustration of one embodiment of an H-TDM frame.

FIG. 6A depicts one embodiment of the overlay synchronous timeslot scheme of the H-TDM frame. Specifically, FIG. 6A illustrates a 125 μs synchronization window containing an overlay synchronous timeslot scheme comprising a start of frame delimiter (SFD) 603, a synchronization timestamp (Sync) 604, a timeslot map (TS Map) 606, and a payload 608. The SFD 603 may delineate a beginning of the H-TDM frame, and may be a reserved Ethernet control symbol, such as the /K28.1/control symbol. As one skilled in the art will recognize, the /K28.1/control symbol includes a comma that may be used to enable 8 bit/10 bit (8B/10B) symbol synchronization when the overlay synchronous timeslot scheme is communicated on 8B/10B encoded media. In an embodiment, the SFD 603 may also specify the size of the overlay synchronous timeslot scheme. The Sync 604 follows the SFD 603. As described below, the Sync 604 in the H-TDM operational mode differs from the Sync 202 in the H-Sync operational mode in that the Sync 604 may be used to initiate the synchronization windows, synchronize the synchronization windows, and phase-align the synchronization windows between two nodes.

The overlay synchronous timeslot scheme may continue with the TS Map 606, which may specify the type and location of the data in the payload 608. In one embodiment, the individual timeslots for the payload 608 may be assigned to TDM, HPF, and BEP traffic according to a predefined pattern. For example, the first thousand timeslots may be assigned to TDM traffic, the next five thousand timeslots may be assigned to HPF traffic, and the next three thousand timeslots may be assigned to BEP traffic. In such an embodiment, the TS Map 606 may be omitted from the H-TDM frame if the nodes are aware of the predefined pattern. Alternatively, the TS Map 606 may indicate the allocation of each timeslot in the payload 608 as a TDM, a HPF, or a BEP timeslot. Using the TS Map 606, TDM, HPF, and BEP traffic may be dynamically interleaved within the overlay synchronous timeslot scheme.

A detailed description of the TS Map 606 and the dynamic interleaving of the TDM, HPF, and BEP traffic may be found in the aforementioned provisional patent applications.

Some timeslots at the beginning and/or end of the synchronization window may be part of a guard interval 602. The guard intervals 602 allow the H-TDM frame to float within the synchronization window. Specifically, the location of SFD 603 in relation to the start of the synchronization window may vary between synchronization windows. As such, the guard interval 602 at the beginning of the synchronization window may be the same or a different size than the guard interval 602 at the end of the synchronization window, and the size of the guard intervals 602 in one synchronization window may vary from the size of the guard intervals 602 in other synchronization windows. Such an embodiment may be advantageous because the integrity of the SFD 603, Sync 604, TS Map 606, and the TDM or HPF data in the payload 608 is maintained if any of the data in the guard intervals 602 is dropped, corrupted, lost, or otherwise unreadable, for example, due to clock tolerances or other non-deterministic factors. In some embodiments, the guard interval 602 may transport low priority best-effort packet (BEP) data. Alternatively, the guard interval 602 may be zero-padded or may contain idle characters.

Figure 6B:
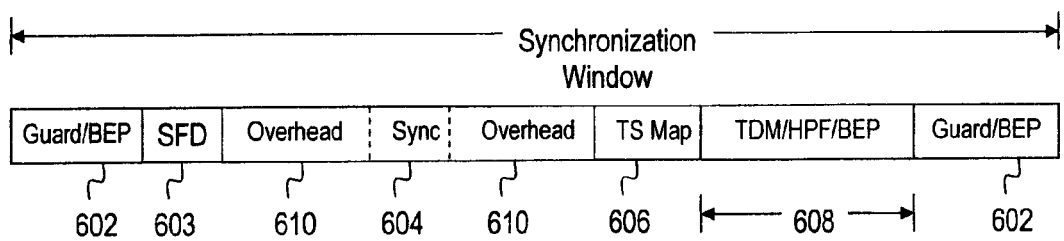
FIG. 6B is an illustration of another embodiment of the H-TDM frame.

Although the synchronization window may be any duration, there are particular advantages to using a synchronization window with a period of 125 µs. Specifically, synchronizing the overlay synchronous timeslot schemes to a 125 µs synchronization window enables the Ethernet nodes to be interoperable with the PSTN, SONET, SDH, and other TDM networks. As such, when the overlay synchronous timeslot scheme has a 125 µs window, SONET/SDH transport overhead may be added to the overlay synchronous timeslot scheme format. FIG. 6B illustrates an overlay synchronous timeslot scheme containing SONET/SDH transport overhead 610. The SONET/SDH transport overhead 610 allows the data in the payload 608 to be efficiently mapped between Ethernet networks and the SONET/SDH networks used by the PSTN. The SONET/SDH transport overhead 610 is depicted as surrounding the Sync 604 because the Sync 604 may be inserted into undefined octets of the SONET/SDH transport overhead 610. A detailed description of the mapping of the H-TDM frames between the Ethernet format and the SONET/SDH format may be found in the aforementioned provisional patent applications.

Figure 7A:
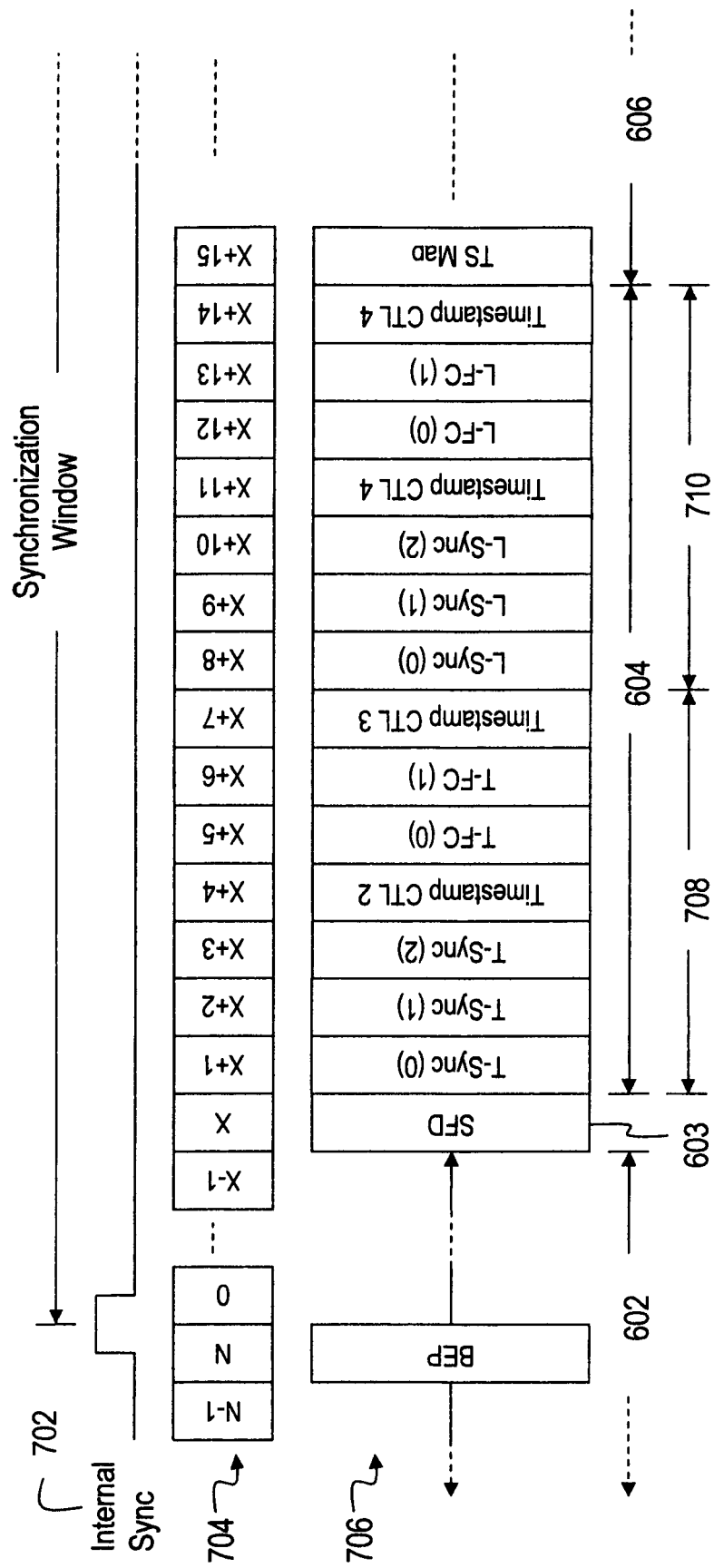
FIG. 7A is an illustration of another embodiment of the H-TDM frame.

FIG. 7A illustrates a more detailed layout of the Sync 604 from FIG. 6A. FIG. 7A contains three rows of information: an internal synchronization signal 702 that delineates the synchronization window, a timeline 704 that enumerates each timeslot, and a descriptor 706 that describes the data that may be contained within each timeslot. The internal synchronization signal 702 may correspond to the synchronization window established when initiating the H-Sync or H-TDM operational modes. Timeslots N, 0, and all other timeslots prior to X represent the guard intervals 602 described above, and thus the descriptor 706 indicates that BEP traffic may be transported during these timeslots. At timeslot X, the SFD 603 may delineate the start of the H-TDM frame. The Sync 604 follows the SFD 603 and is shown in timeslots X+1 through X+14. The first seven timeslots of the Sync 604, timeslots X+1 through X+7, provide a forward timestamp 708, and the last seven timeslots of the Sync 604, timeslots X+8 through X+14, provide a loop-back timestamp 710, each of which are described in detail below. The TS Map 606 may follow in timeslot X+15 and subsequent timeslots. In one embodiment, one or more idle octets or SONET/SDH transport overhead 610 octets may be inserted between timeslots X+7 and X+8. Such octets enable efficient mapping of the Sync 604 to an SONET/SDH frame, such that the Sync 604 aligns with the columns of the SONET/SDH frame.

Figure 7B:
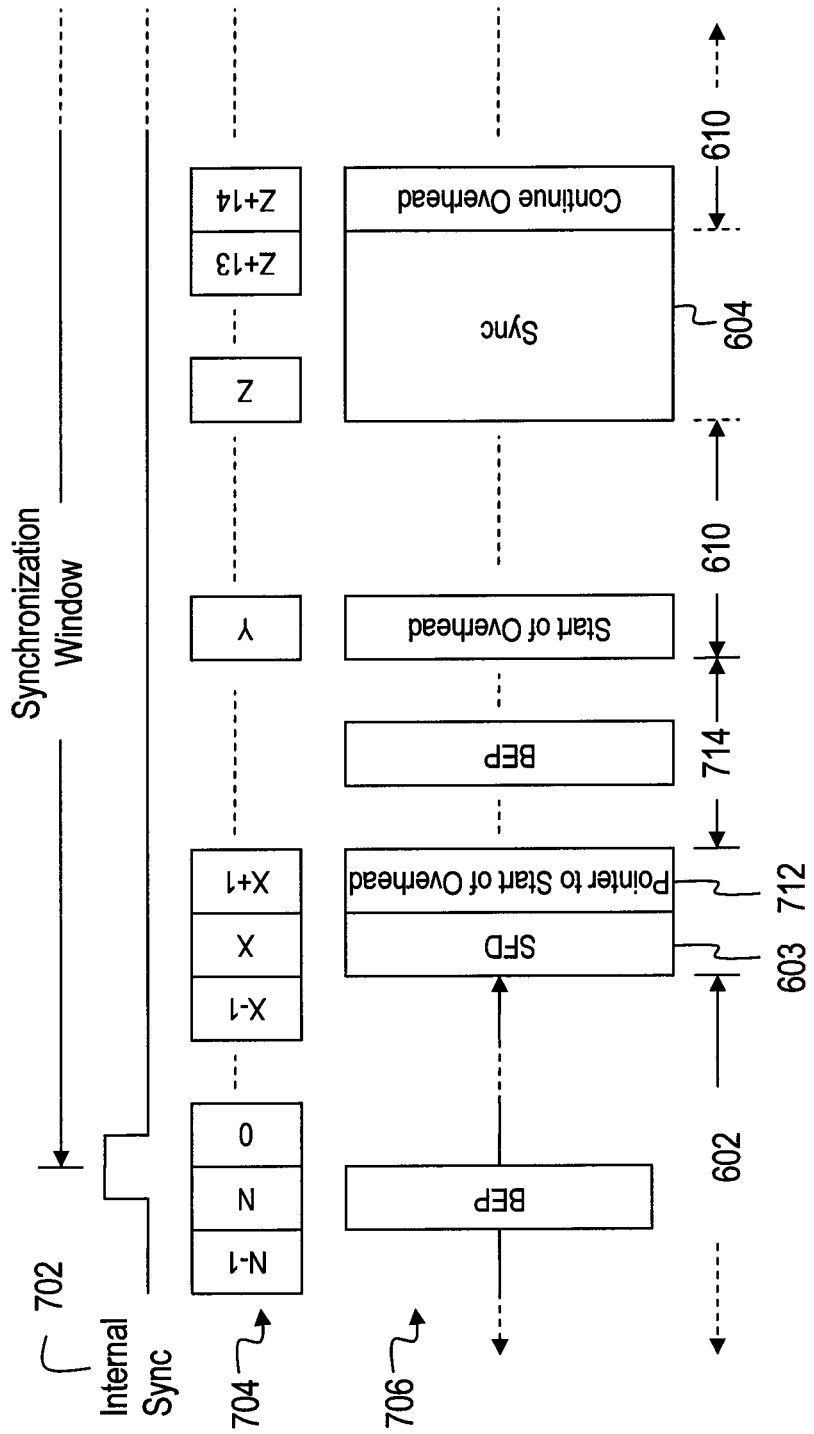
FIG. 7B is an illustration of another embodiment of the H-TDM frame.

FIG. 7B illustrates a more detailed layout of the Sync 604 from FIG. 6B. The information contained in FIG. 7B is similar to the information contained in FIG. 7A. However, rather than immediately communicating the Sync 604, the overlay synchronous timeslot scheme first communicates the SONET/SDH transport overhead 610. When communicating the overlay synchronous timeslot scheme over 64 bit/66 bit (64B/66B) encoded media, there may be an offset between the SFD 603 and the beginning of the SONET/SDH transport overhead 610, which may provide rapid and deterministic alignment to 64B/66B sync fields. As such, the overlay synchronous timeslot scheme may include a pointer 712 that follows the SFD 603 and points to the start of the SONET/SDH transport overhead 610. BEP data may be communicated in the offset interval 714 between the pointer 712 and the start of the SONET/SDH transport overhead 610 at timeslot Y. Alternatively, idle data may be communicated in the offset interval 714. The Sync 604 may be communicated within undefined octets of the SONET/SDH transport overhead 610. As such, a first portion of the SONET/SDH transport overhead 610 may be communicated from timeslot Y to timeslot Z−1, and the Sync 604 may be communicated between timeslot Z through timeslot Z+13. Starting at timeslot Z+14, a second portion of the SONET/SDH transport overhead 610 may communicate the remainder of the SONET/SDH transport overhead 610.

FIG. 8 illustrates one embodiment of the forward timestamp 708. Specifically, FIG. 8 illustrates a seven-octet forward timestamp 708, where each row represents an octet and each column represents the position of the bits within the octet. The octets may be arranged in order of significance from top to bottom such that the least significant octet, octet 0, is at the top and the most significant octet, octet 6, is at the bottom. Similarly, the bits may be arranged in order of significance from left to right, such that the LSB of each octet, bit 0, is at the left and the MSB of each octet, bit 7, is at the right. As is common in Ethernet communications, data may be communicated from the LSB to the MSB and from least significant octet to most significant octet, such that the bits are communicated row-by-row from left to right starting with the top octet and ending with the bottom octet.

The first three octets of the forward timestamp 708 may specify a twenty-four bit timestamp, T-Sync. The layout and properties of the timestamp are similar to the timestamp in the Sync 202 described above. Also similar to the Sync 202, the fourth octet, octet 3, of the forward timestamp 708 may be a control octet that may be used to initiate or maintain synchronized communication between nodes. Specifically, the first five bits, bit 0 through bit 4, indicate the quality of the clock of the node that is communicating the Sync 604. While bits 5 and 6 of octet 3 are used to establish the H-TDM operational mode as described above, these bits may be left open once the H-TDM operational mode is established between the two nodes. Bit 7 of octet 3 may be used as a parity bit for verifying the integrity of the first four octets.

In addition to the twenty-four bit clock used for the T-Sync and other timestamps, each node that supports the H-TDM operational mode may maintain a sixteen-bit clock that counts once at the end of each window. For example, with each bit representing 0.01 ns, a 125 µs synchronization window may be reached when the twenty-four bit digital clock reaches a value of "101111101011110000100000." Each time the twenty-four bit digital clock reaches this value, it may reset, and the sixteen-bit digital clock may increment once. Thus, the nodes may use the sixteen-bit clock to identify the individual frames with a frame count timestamp, which is similar to an identification or serial number.

The next two octets in the forward timestamp 708, octet 4 and octet 5, specify the frame count timestamp, T-FC. The T-FC may be used to account for multi-frame periods of delay in the communication between an upstream node and a downstream node as described below. With sixteen bits available for the T-FC, each bit may represent one 125 µs window for a total range of about 8.192 seconds. Octet 4 contains the LSBs of the sixteen-bit T-FC, which may be bits 00 through 07 located in bit 0 through bit 7. Octet 5 contains the MSBs of the sixteen-bit T-FC, which may be bits 08 through 15 located in bit 0 through bit 7. The last octet in the forward timestamp 708, octet 6, has the first seven bits, bit 0 through bit 6, open, and uses the eighth bit, bit 7, as a parity bit for verifying the integrity of the forward timestamp 708. The loop-back timestamp 710 may be formatted similar to the forward timestamp 708, but with different loop-back values for the timestamp and frame count as described below.

Figure 9A:
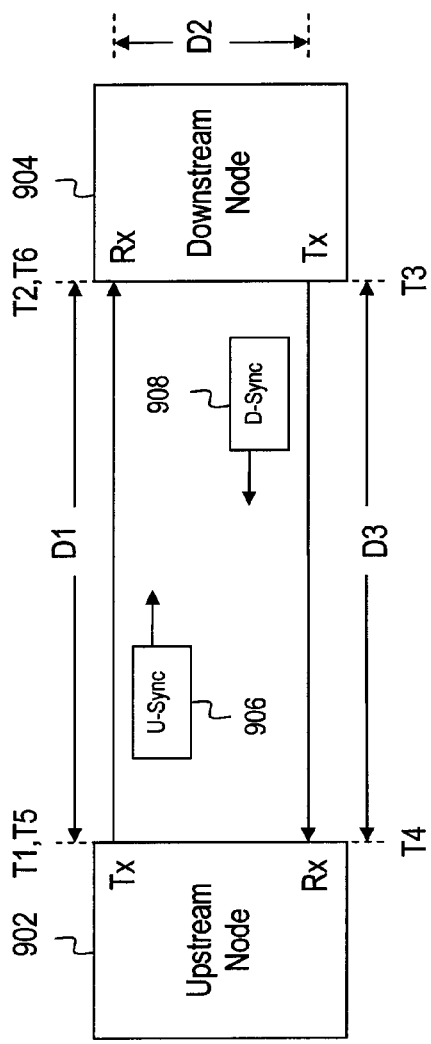
FIG. 9A is an illustration of another embodiment of a process of establishing synchronized communication.

FIG. 9A illustrates an exemplary block diagram of the process for establishing the H-TDM operational mode. The process may begin when an upstream node 902 creates an upstream synchronization timestamp (U-Sync) 906 with the format of the Sync 604. The upstream node 902 sets the U-Sync's forward timestamp 708 values equal to the relative time of the upstream node 902. Specifically, the value of the upstream node's twenty-four bit clock at time T1 may be inserted into the T-Sync field, and the value of the upstream node's sixteen-bit clock at time T1 may be inserted into the T-FC field. Concurrently, the upstream node 902 may also internally record the T-Syncs associated with each T-FC, thereby creating a record of when each U-Sync 906 was transmitted. Zero values may be transmitted in the loop-back synchronization timestamp (L-Sync) and the loop-back frame count (L-FC) fields in the loop-back timestamp 710 on the first communication iteration of this process. The upstream node 902 may then transmit the U-Sync 906 to the downstream node 904 at time T1. A transmission delay, D1, may occur while the U-Sync 906 is being transported from the upstream node 902 to the downstream node 904.

At time T2, the downstream node 904 receives the U-Sync 906 and stores an internal timestamp indicating when the U-Sync 906 was received. Upon receiving the U-Sync 906, the downstream node 904 processes the timestamp, which causes an internal processing delay, D2. As part of the processing, the downstream node 904 may create a downstream synchronization timestamp (D-Sync) 908 with a format similar to the Sync 604. When creating the D-Sync 908, the downstream node 904 may set the D-Sync's forward timestamp 708 values equal to the relative time of the downstream node 904. Specifically, the value of the downstream node's twenty-four bit clock at time T3 may be inserted into the T-Sync field, and the value of the downstream node's sixteen-bit clock at time T3 may be inserted into the T-FC field. The downstream node 904 may also set the value of the L-Sync equal to the calculated internal processing delay, D2, which may be calculated by subtracting the internal timestamp that indicates when the U-Sync 906 was received from the internal timestamp at time T3. In addition, the downstream node 904 may set the value of the L-FC equal to the T-FC value in the U-Sync 906. The downstream node 904 then transmits the D-Sync 908 to the upstream node 902 at time T3. A transmission delay, D3, occurs while the D-Sync 908 is being transported from the downstream node 904 to the upstream node 902. In some embodiments, it may be assumed that there are symmetric transmission delays between the upstream node 902 and the downstream node 904, such that the value of D3 is equal to the value of D1.

At time T4, the upstream node 902 receives the D-Sync 908 and calculates the transmission delay D1. As part of the calculation of the transmission delay D1, a total delay, $D_{Total}$, is first calculated. The upstream node 902 can correlate the U-Sync 906 to the D-Sync 908 using the T-FC in the U-Sync 906 and the L-FC in the D-Sync 908. Thus, the upstream node 902 can determine that the U-Sync 906 was transmitted at time T1 and the corresponding D-Sync 908 was received at time T4. The total delay may be equal to the difference between time T4 and T1, and may also be equal to the sum of the internal processing delay D2 at the downstream node 904 and the two transport delays, D1 and D3. This relationship is illustrated in equation 1:

$$D_{total} = T4 - T1 = D1 + D2 + D3. \quad (1)$$

Using the assumption that the value of D3 is equal to the value of D1, the total delay is equal to twice the transmission delay D1 plus the internal processing delay D2. This relationship is illustrated in equation 2:

$$D_{Total} = (2 * D1) + D2. \quad (2)$$

To calculate the transmission delay D1, the internal processing delay D2 that was received in the L-Sync of the D-Sync 908 may be subtracted from the calculated total delay and the result may be divided by two, as shown in equation 3:

$$D1 = (D_{Total} - D2)/2. \quad (3)$$

The upstream node 902 can use the transport delay D1 to synchronize its clock with the downstream node's clock, if desired. Specifically, the upstream node 902 can use the transport delay D1 and the forward timestamp 708 from the downstream node 904 to synchronize the upstream node's clock with the downstream node's clock, and phase-align the upstream node's synchronization windows with the downstream node's synchronization windows. However, doing so does not inform the downstream node 904 of the upstream node's processing delay and/or the existence of the frequency-synchronization and phase-alignment. Thus, the upstream node 902 may send a second U-Sync 906 to the downstream node 904. Specifically, at time T5, the upstream node 902 transmits the second U-Sync 906 with the forward timestamp 708 values equal to the relative time of the upstream node 902 at time T5, and the loop-back timestamp 710 equal to the calculated transmission delay D1. At time T5, the upstream node 902 may also store an internal timestamp indicating when the U-Sync 906 was transmitted for subsequent transmission delay calculations. Like before, the transmission delay D1 occurs while the U-Sync 906 is being transported from the upstream node 902 to the downstream node 904.

At time T6, the downstream node 904 receives the U-Sync 906 and stores an internal timestamp indicating when the U-Sync 906 was received. Upon receiving the U-Sync 906, the downstream node 904 internally processes the timestamp. As part of the internal processing, the downstream node's clock, D-Clock, may be reset to be equal to the value of the upstream node's clock, U-Clock. This may be accomplished by setting the value of the downstream node clock equal to the sum of the forward timestamp 708 and the loop-back timestamp 710 received in the U-Sync 906, as shown in equation 4:

$$D\text{-Clock} = U\text{-Clock} = T5 + D1 = \text{forward timestamp} + \text{loop-back timestamp} \quad (4)$$

As mentioned above, the first communication iteration may have zero values for the L-Sync and the L-FC fields. In such a case, the downstream node 904 effectively sets the value of its clock equal to the forward timestamp 708. Because the first communication iteration does not take into account the transmission delay, the downstream node 904 may be frequency-synchronized but may not be phase-aligned to the upstream node 902, similar to the H-Sync operational mode. Alternatively, rather than resetting the downstream node clock, an offset between the clock and the received timestamp may be recorded to enable the downstream node 904 to be frequency-synchronized and phase-aligned to multiple nodes. The process described above continues such that the upstream node 902 and the downstream node 904 adjust the frequency-synchronization and phase-alignment with every synchronization window when the upstream node 902 and the downstream node 904 operate in the H-TDM operational mode.

Figure 9B:
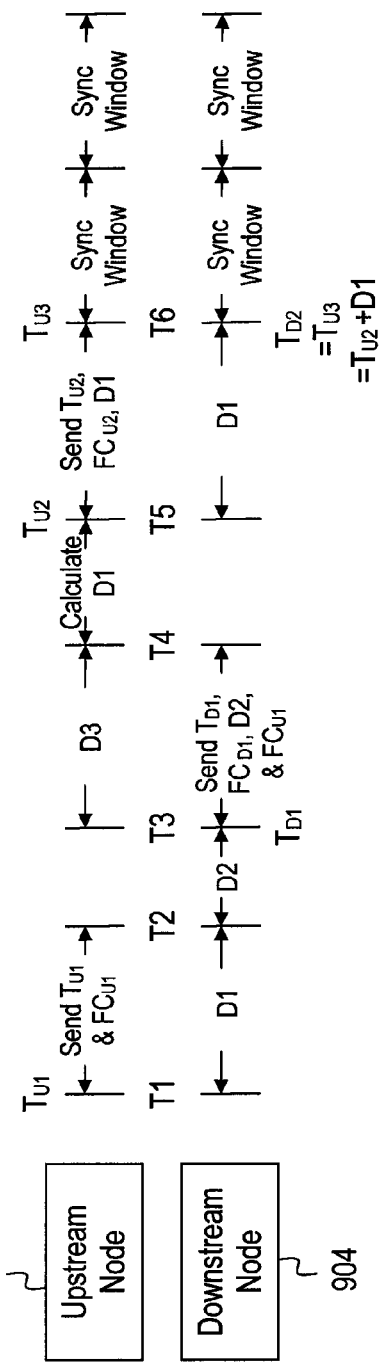
FIG. 9B is an illustration of another embodiment of a timeline for establishing synchronized communication.

FIG. 9B illustrates a timeline of a successful initiation of frequency-synchronized and phase-aligned communication between the upstream node 902 and the downstream node 904. Like FIG. 5B, FIG. 9B contains a separate timeline for each of the upstream node 902 and the downstream node 904, where each timeline represents time relative to the corresponding node. Specifically, the time relative to the upstream node 902 may be shown above the timeline for the upstream node 902 and indicated by $T_{Ux}$, where x may be an integer. The time relative to the downstream node 904 may be shown below the timeline for the downstream node 904 and indicated by $T_{Dx}$, where x may be an integer. An absolute time may be shown between the two timelines and indicated by Tx, where x may be an integer. The time relative to the upstream node 902 and the time relative to the downstream node 904 may not necessarily be equal to the absolute time.

At time T1, the upstream node 902 communicates the U-Sync 906 to the downstream node 904. The U-Sync 906 includes a timestamp set to the relative time of the upstream node 902 when the U-Sync 906 is transmitted. In the exemplary timeline shown in FIG. 9B, the forward timestamp 708 has the T-Sync set to the twenty-four bit clock time for $T_{U1}$ and the T-FC set to the sixteen-bit clock time for $T_{U1}$. At time T1, concurrent with communicating the U-Sync 906, the upstream node 902 stores the relative time $T_{U1}$ for use in subsequently calculating a total delay as described above.

As shown in the timeline for the downstream node 904, there may be a transmission delay, D1, when communicating the U-Sync 906 from the upstream node 902 to the downstream node 904. At time T2, the downstream node 904 receives the U-Sync 906, processes the U-Sync 906, and calculates the processing delay D2. At time T3, the downstream node 904 transmits the D-Sync 908, which includes the forward timestamp 708 set to the relative time of the downstream node 904. In the exemplary timeline shown in FIG. 9B, the forward timestamp 708, including the synchronization window timestamp and the frame count timestamp, may be set to time $T_{D1}$. The D-Sync 908 also includes a loop-back timestamp 710 with L-Sync set to the calculated internal processing delay D2 and the L-FC set to the T-FC received in the U-Sync 906.

As shown in the timeline for the upstream node 902, there may be a transmission delay D3 when communicating the D-Sync 908 from the downstream node 904 to the upstream node 902. At time T4, the upstream node 902 receives the D-Sync 908 and calculates the one-way transmission delay between the upstream node 902 and the downstream node 904. At time T5, the upstream node transmits another U-Sync 906 that includes a timestamp set to the upstream node 902 relative time when the U-Sync 906 is transmitted. In the exemplary timeline shown in FIG. 9B, the forward timestamp 708 has the T-Sync and the T-FC set to time $T_{U2}$. The U-Sync 906 also has the loop-back timestamp 710 with L-Sync and L-FC set to indicate the calculated delay D1.

As shown in the timeline for the downstream node 904, there may be a transmission delay D1 when communicating the U-Sync 906 from the upstream node 902 to the downstream node 904. At time T6, the downstream node 904 receives and processes the U-Sync 906. As part of the processing, the downstream node 904 sets the downstream node clock equal to the sum of the forward timestamp 708 and the loop-back timestamp 710. As shown in FIG. 9B, such a method of resetting the downstream node 904 clock aligns the synchronization windows of the upstream node 902 and the downstream node 904 in frequency and phase. In particular, the downstream node clock may be reset at time T6 such that the relative time of the downstream node, $T_{D2}$, may be equal to the relative time of the upstream node, $T_{U3}$, which may be equal to the sum of the forward timestamp 708 of the U-Sync 906, $T_{U2}$, and the delay D1.

Figure 10:
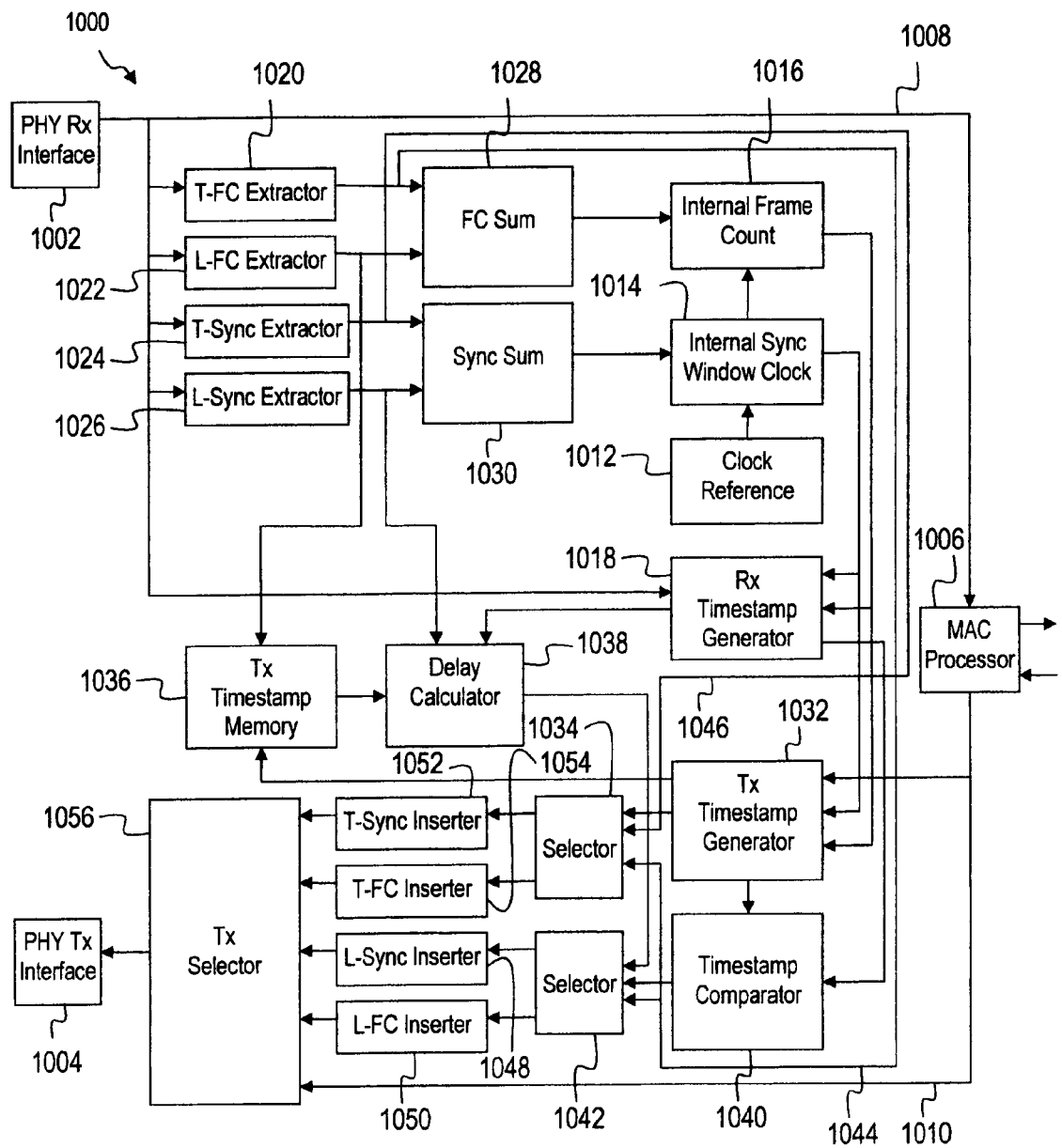
FIG. 10 is an illustration of an embodiment of a clocking architecture.

FIG. 10 illustrates an exemplary functional block diagram of a clocking architecture for supporting the frequency-synchronized communication in the H-Sync operational mode and the frequency-synchronized and phase-aligned communication in the H-TDM operational mode. As shown in FIG. 10, a network node 1000 may have a Physical Layer receiver (PHY Rx) interface 1002, a Physical Layer transmitter (PHY Tx) interface 1004, and a Media Access Control Layer (MAC) processor 1006. The PHY Rx interface 1002 receives data from a communication medium, and the PHY Tx interface 1004 transmits data to a communication medium. While a single PHY Rx interface 1002 and PHY Tx interface 1004 pair may be shown on the network node 1000, it may be contemplated that a plurality of PHY Rx interface 1002 and PHY Tx interface 1004 pairs may be implemented on the network node 1000. Each PHY Rx interface 1002 and PHY Tx interface 1004 pair may represent one port for supporting full-duplex communication with other network nodes.

The MAC processor 1006 interprets and frames data received on communication link 1008 from the PHY Rx interface 1002 for use by other logic (not shown), e.g. switch fabric, on the network node 1000. The MAC processor 1006 also transmits frames of data received from the other logic on the network node 1000, and communicates the data on communication link 1010 to be transmitted by the PHY Tx interface 1004. In an embodiment, the data processed by the MAC processor 1006 may be formatted in accordance with a standard Ethernet packet or in accordance with one of the frame formats illustrated in FIGS. 6A and 6B.

The network node 1000 may use a clock reference 1012 to establish an internal synchronization window clock 1014. The clock reference 1012 may be an internal reference such as a voltage-controlled crystal oscillator or some other oscillator that provides a reference clock with an accuracy of ±about 20 ppm. The clock reference 1012 may also be an external reference such as a clock signal received from external logic. For example, if the network node 1000 was implemented as a line card, then the network node 1000 may receive the clock reference 1012 from a switching fabric with which the network node 1000 is connected. The clock reference 1012 may also be an external reference that may be a distributed clock signal such as a building integrated timing supply (BITS).

As mentioned above, the internal synchronization window clock 1014 may be implemented as a twenty-four bit digital clock that measures time within a synchronization window. Each time the internal synchronization window clock 1014 reaches the end of the synchronization window, it may reset to begin tracking time in a subsequent synchronization window.

The internal frame count 1016 may be implemented as a sixteen bit digital clock that may be incremented once at the end of each synchronization window. Together, the value of the internal synchronization window clock 1014 and the value of the internal frame count 1016 make up an internal timestamp that may be used as described below.

When receiving data on the PHY Rx interface 1002, a new data frame may be indicated with a start of frame delimiter (SFD). The network node 1000 may have a receiving (Rx) timestamp generator 1018 that may use the values of the internal synchronization window clock 1014 and the value of the internal frame count 1016 to generate an Rx timestamp that indicates when the new data frame was received. The value of the Rx timestamp may be used by a delay calculator 1038 and a timestamp comparator 1040 as described in detail below. Subsequent to the SFD, a Sync 604 may be received by the PHY RX interface 1002. The Sync 604 includes a forward timestamp 708 containing a T-Sync value and a T-FC value, and a loop-back timestamp 710 containing an L-Sync value and an L-FC value. The internal node may extract each of these values with a T-FC Extractor 1020, an L-FC Extractor 1022, a T-Sync Extractor 1024, and an L-Sync Extractor 1026.

As discussed in detail above, the downstream node 904 operating in the H-TDM operational mode may reset their clock with the sum of the forward timestamp 708 and the loop-back timestamp 710 received from the upstream node 902. If the network node 1000 is operating as the downstream node 904, then the values of the T-FC Extractor 1020 and the L-FC Extractor 1022 may be input to a frame count (FC) sum 1028, thereby generating a sum of the two FC values. The sum value generated by the FC sum 1028 may be used to update the value of the internal frame count 1016 of the network node 1000. Similarly, the values of the T-Sync Extractor 1024 and the L-Sync Extractor 1026 may be input to a synchronization (Sync) sum 1030. The sum value generated by the Sync sum 1030 may be used to update the value of the internal synchronization window clock 1014 of the downstream node 904.

When the network node 1000 is operating in the H-Sync operational mode, the values of the L-FC Extractor 1022 and the L-Sync Extractor 1026 may be initialized to zero. As discussed above, the Sync 202 only communicates values that may be extracted by the T-FC Extractor 1020 and the T-Sync Extractor 1024. As such, when the network node 1000 is operating as the downstream node 904 in the H-Sync operational mode, the internal frame count 1016 and the internal synchronization window clock 1014 may be updated with the values of the T-FC Extractor 1020 and the T-Sync Extractor 1024, respectively. When the network node 1000 is not operating as the downstream node 904, then the FC sum 1028 and the Sync sum 1030 may be disabled such that the internal frame count 1016 and the internal synchronization window clock 1014 are not updated.

When transmitting data on the PHY Tx interface 1004, a new data frame may be indicated with a SFD. The network node 1000 may have a transmitting (Tx) timestamp generator 1032 that uses the values of the internal synchronization window clock 1014 and the internal frame count 1016 to generate a Tx timestamp that indicates when a new data frame is transmitted. The value of the Tx timestamp may be input to a selector 1034 discussed in detail below.

When the network node 1000 is operating as the upstream node 902 in the H-TDM operational mode, the value of the Tx timestamp may also be input to a Tx timestamp memory 1036. When the upstream node 902 transmits the U-Sync 906, the timestamp that indicates when the transmission occurs may be stored at the upstream node 902. When the upstream node 902 receives the D-Sync 908 from the downstream node 904, the value of the L-FC in the D-Sync 908 may be used to reference the timestamp with which the D-Sync 908 corresponds. When the network node 1000 is operating as the upstream node 902 in the H-TDM operational mode, the value of the L-FC Extractor 1022 may be input to the Tx timestamp memory 1036 and used as a reference when reading the timestamp that indicates when the corresponding U-Sync 906 was transmitted.

The value read from the Tx timestamp memory 1036 may be input to a delay calculator 1038. The delay calculator 1038 also receives inputs from the Rx timestamp generator 1018 and the L-Sync Extractor 1026. As part of calculating the one-way transmission delay, a total delay is first calculated. The delay calculator 1038 may calculate the total delay by subtracting the value of the Rx timestamp generator 1018 from the value read from the Tx timestamp memory 1036. The value of the Rx timestamp generator 1018 corresponds to the time that the D-Sync 908 may be received at the network node 1000 when it is implemented as the upstream node 902. The delay calculator 1038 may then calculate the two-way transmission delay by subtracting the value of the L-Sync Extractor 1026 from the result of the previous subtraction. The value of the L-Sync Extractor 1026 corresponds with the internal delay, D2, calculated by the downstream node 904. The delay calculator 1038 may then determine the one-way transmission delay by dividing the result of the subtraction by two. The delay calculated by the delay calculator 1038 may be input to a selector 1042, discussed in more detail below.

When the network node 1000 is operating as the downstream node 904 in the H-TDM operational mode, the value of the Tx timestamp may also be input to a timestamp comparator 1040. The timestamp comparator 1040 receives inputs from the Rx timestamp generator 1018 and the Tx timestamp generator 1032. The downstream node 904 may then calculate the internal processing delay, D2, and the timestamp comparator 1040 outputs a difference between the Rx timestamp and the Tx timestamp to determine the internal processing delay, D2. The difference calculated by the timestamp comparator 1040 may be input to the selector 1042.

The selector 1042 may be used to select which values are input to an L-Sync Inserter 1048 and an L-FC Inserter 1050. When the network node 1000 operates as the downstream node 904, the selector 1042 may select the timestamp comparator 1040 output for the value in the L-Sync Inserter 1048, and may select the T-FC Extractor 1020 value from communication link 1044 for the value of the L-FC Inserter 1050. When the network node 1000 operates as the upstream node 902, the selector 1042 may select the delay calculator 1038 output for the value of the L-Sync Inserter 1048 and the L-FC Inserter 1050.

Similarly, the selector 1034 may be used to select which values are input to a T-Sync Inserter 1052 and a T-FC Inserter 1054. When the network node 1000 operates in the H-TDM operational mode, the selector 1034 may select the Tx timestamp generator 1032 output. When the network node 1000 operates as the downstream node 904 in the H-Sync operational mode, the selector 1034 may select the T-Sync Extractor 1024 value from the communication link 1046 for the value of the T-Sync Inserter 1052. When the network node 1000 operates as the upstream node 902 in the H-Sync operational mode, the selector 1034 may select the Tx timestamp generator 1032 output for the value of the T-Sync Inserter 1052.

A Tx selector 1056 receives the values held in each of the T-Sync Inserter 1052, T-FC Inserter 1054, L-Sync Inserter 1048, L-FC Inserter 1050, and data communicated on communication link 1010, and selects each in succession for transmission by the PHY Tx interface 1004. In an embodiment, the Tx selector 1056 selects each of the values such that the PHY Tx interface 1004 transmits data according to one of the formats shown in FIG. 6A or 6B. When the network node 1000 operates as the upstream node 902 in the H-Sync operational mode, the Tx selector 1056 may select the communication link 1010 for transmitting standard Ethernet packets, and may select the value held in the T-Sync Inserter 1052 during the IPG 102 to transmit the Sync 202.

One skilled in the art will recognize that the network node 1000 may be implemented as one or a combination of a plurality of application specific integrated circuits (ASICs) or implemented using general purpose computing, described in detail below. In an embodiment, the synchronization functions of the network node 1000 may be implemented for each port of a line card or other network interface card. Implementing the synchronization functions at each port enables each port of a line card or other network interface card to be asynchronously synchronized to a plurality of different upstream and downstream network nodes at the same time. In other words, each port may have an internal synchronization window clock 1014 and internal frame count 1016 synchronized with another network node, but the internal synchronization window clock 1014 and internal frame count 1016 does not need to be synchronized on all ports.

In another embodiment, the synchronization functions of the network node 1000 may be implemented to synchronize all ports of a line card or other network interface card. In this embodiment, all of the ports on the line card or other network interface card may be synchronized to a single upstream network node. In a further embodiment, the synchronization functions of the network node 1000 may be implemented on a switching fabric or other higher-level hardware to synchronize communication of one or more line cards or other network interface cards.

Figure 11:
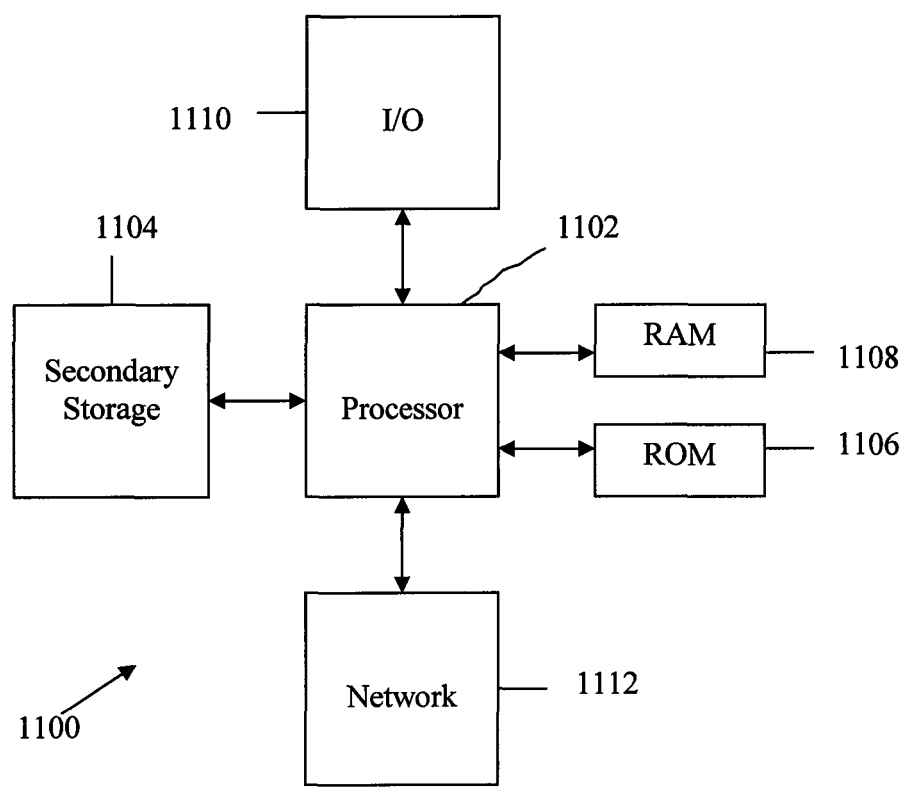
FIG. 11 is an illustration of one embodiment of a general-purpose computer system suitable for implementing the several embodiments of the disclosure.

The upstream node 502, the downstream node 504, the upstream node 902, the downstream node 904, and the network node 1000 described above may be implemented on any general-purpose computer with sufficient processing power, memory resources, and network throughput capability to handle the necessary workload placed upon it. FIG. 11 illustrates a typical, general-purpose computer system suitable for implementing one or more embodiments disclosed herein. The computer system 1100 includes a processor 1102 (which may be referred to as a central processor unit or CPU) that may be in communication with memory devices including secondary storage 1104, read only memory (ROM) 1106, random access memory (RAM) 1108, input/output (I/O) devices 1110, and network connectivity devices 1112. The processor 1102 may be implemented as one or more CPU chips.

The secondary storage 1104 may be typically comprised of one or more disk drives or tape drives and may be used for non-volatile storage of data and as an over-flow data storage device if RAM 1108 may not be large enough to hold all working data. Secondary storage 1104 may be used to store programs that are loaded into RAM 1108 when such programs are selected for execution. The ROM 1106 may be used to store instructions and perhaps data, which are read during program execution. ROM 1106 may be a non-volatile memory device, which typically has a small memory capacity relative to the larger memory capacity of secondary storage 1104. The RAM 1108 may be used to store volatile data and perhaps to store instructions. Access to both ROM 1106 and RAM 1108 may be typically faster than to secondary storage 1104.

I/O devices 1110 may include printers, video monitors, liquid crystal displays (LCDs), touch screen displays, keyboards, keypads, switches, dials, mice, track balls, voice recognizers, card readers, paper tape readers, or other well-known input devices. The network connectivity devices 1112 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity devices 1112 may enable the processor 1102 to communicate with an Internet or one or more intranets. With such a network connection, it may be contemplated that the processor 1102 might receive information from the network, or might output information to the network in the course of performing the above-described method steps. Such information, which may be often represented as a sequence of instructions to be executed using processor 1102, may be received from and outputted to the network, for example, in the form of a computer data signal embodied in a carrier wave.

Such information, which may include data or instructions to be executed using processor 1102 for example, may be received from and outputted to the network, for example, in the form of a computer data base band signal or signal embodied in a carrier wave. The base band signal or signal embodied in the carrier wave generated by the network connectivity devices 1112 may propagate in or on the surface of electrical conductors, in coaxial cables, in waveguides, in optical media, for example optical fiber, or in the air or free space. The information contained in the base band signal or signal embedded in the carrier wave may be ordered according to different sequences, as may be desirable for either processing or generating the information or transmitting or receiving the information. The base band signal or signal embedded in the carrier wave, or other types of signals currently used or hereafter developed, referred to herein as the transmission medium, may be generated according to several methods well known to one skilled in the art.

The processor 1102 executes instructions, codes, computer programs, scripts which it accesses from hard disk, floppy disk, optical disk (these various disk based systems may all be considered secondary storage 1104), ROM 1106, RAM 1108, or the network connectivity devices 1112.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented. In addition, persons of ordinary skill in the art will appreciate that the term octet as used herein is synonymous with the term byte, and that the octets described herein do not necessarily have to contain eight bits.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A network component comprising:
   at least one processor coupled to a memory and configured to promote transmission of a frame from a first node to a second node, the frame comprising an Open System Interconnection (OSI) layer two header and a payload, wherein the OSI layer two header comprises:
   a clock synchronization data; and
   a frame count,
   wherein the clock synchronization data and the frame count are used to synchronize a second clock in the second node with a first clock in the first node,
   wherein the clock synchronization data is about four octets long and comprises a timestamp that is about three octets long and a control field that is about one octet long, and
   wherein the frame count is about three octets long and comprises a timestamp that is about two octets long and a control field that is about one octet long.

2. The component of claim 1, wherein the frame is one of a plurality of frames with similar data structures, and wherein the frames are transmitted on intervals of about 125 microseconds.

3. The component of claim 1, wherein the clock synchronization data has a resolution of about 0.01 nanoseconds, wherein the clock synchronization data has a range of no more than about 168 microseconds, and wherein the clock synchronization data has a period of about 125 microseconds.

4. The component of claim 1, wherein a frame comprises:
   an Ethernet control symbol that delineates the beginning of the frame; a first clock synchronization data;
   a frame count that comprises a timestamp and a control field; and
   a second clock synchronization data.

5. The component of claim 1, wherein the frame count has a resolution of about 125 microseconds, wherein the frame count has a range of no more than about 8 seconds, and wherein the frame count has a period of about 125 microseconds.

6. The component of claim 1, wherein the OSI layer two header further comprises a start of frame delimiter, and wherein the clock synchronization data is positioned between the start of frame delimiter and the payload.

7. A method implemented by at least one processor coupled to a memory, the method comprising:
   processing a frame comprising an Open System Interconnection (OSI) layer two header and a payload, wherein the OSI layer two header comprises:
   an Ethernet control symbol that delineates the beginning of the frame;
   a first clock synchronization data;
   a frame count; and
   a second clock synchronization data,
   wherein the first dock synchronization data is about four octets long and comprises a timestamp that is about three octets long and a control field that is about one octet long, and
   wherein the frame count is about three octets long and comprises a timestamp that is about two octets long and a control field that is about one octet long.

8. The method of claim 7, wherein the first clock synchronization data is associated with a transmission time of the frame and used to synchronize clock frequency.

9. The method of claim 8, wherein the second clock synchronization data is a transport delay between a first node and a second node and used to synchronize clock phase.

10. The method of claim 8, wherein the second clock synchronization data is a downstream node delay and used to synchronize clock phase.

11. The method of claim 7, wherein the frame interrupts an Ethernet packet.

12. The method of claim 11, wherein the Ethernet packet continues after the frame ends.

13. The method of claim 11, wherein the Ethernet packet and the frame are transmitted on the same interface.

14. The method of claim 7, wherein the OSI layer two header further comprises a timeslot map, and wherein the first clock synchronization data is positioned between the Ethernet control symbol and the timeslot map.

15. A node comprising:
    at least one processor coupled to a memory and configured to synchronize a clock using a clock synchronization data generated by an Open System Interconnection (OSI) layer two component in another node, wherein the clock synchronization data comprises:
    a first timestamp;
    a first frame count;
    a second timestamp; and
    a second frame count,
    wherein the clock synchronization data is about four octets long and comprises a timestamp that is about three octets long and a control field that is about one octet long, and
    wherein the frame count is about three octets long and comprises a timestamp that is about two octets long and a control field that is about one octet long.

16. The node of claim 15, wherein the clock synchronization data is received about every 125 microseconds, and wherein the clock synchronization data is part of an Ethernet frame comprising an Ethernet control symbol that delineates the beginning of the frame, a frame count, and a second clock synchronization data.

17. The node of claim 15, wherein the first timestamp is associated with a transmission time of a frame comprising the clock synchronization data, wherein the first frame count differentiates the frame from a plurality of other similar frames, and wherein the second clock synchronization data is a transport delay between a first node and a second node or a downstream node delay.

18. The node of claim 15, wherein the frame is an OSI layer two frame comprising an OSI layer two header and a payload, wherein the header comprises a start of frame delimiter, the first timestamp, the first frame count, the second timestamp, and the second frame count, in the order listed.

19. The node of claim 18, wherein the start of frame delimiter is an
Ethernet control symbol.

20. The node of claim 18, wherein the OSI layer two header further comprises a timeslot map following the second frame count.

* * * * *